US006761064B2

(12) United States Patent
Tsuji

(10) Patent No.: US 6,761,064 B2
(45) Date of Patent: Jul. 13, 2004

(54) MOVEMENT-DETECTING ALTIMETER

(75) Inventor: Tomoharu Tsuji, Chiba (JP)

(73) Assignee: Seiko Instruments Inc., Chiba (JP)

( * ) Notice: Subject to any disclaimer, the term of this patent is extended or adjusted under 35 U.S.C. 154(b) by 11 days.

(21) Appl. No.: 10/298,712

(22) Filed: Nov. 18, 2002

(65) Prior Publication Data

US 2003/0136191 A1 Jul. 24, 2003

(30) Foreign Application Priority Data

Nov. 19, 2001 (JP) ........................................ 2001-352942

(51) Int. Cl.$^7$ ............................................ G01P 13/00
(52) U.S. Cl. ..................... 73/170.02; 73/865.2; 73/384; 342/122
(58) Field of Search .......................... 73/170.02, 865.2, 73/384; 342/122

(56) References Cited

U.S. PATENT DOCUMENTS

| | | | | |
|---|---|---|---|---|
| 3,715,752 A | * | 2/1973 | Garrett ........................ | 342/33 |
| 3,927,306 A | * | 12/1975 | Miller ......................... | 701/15 |
| 4,107,681 A | * | 8/1978 | Robertson et al. .......... | 342/122 |
| 4,144,571 A | * | 3/1979 | Webber ....................... | 701/217 |
| 4,253,335 A | * | 3/1981 | Shimomura .................. | 73/384 |
| 5,058,427 A | * | 10/1991 | Brandt ......................... | 73/384 |
| 5,517,869 A | * | 5/1996 | Vories ......................... | 73/865.2 |
| 6,678,629 B2 | * | 1/2004 | Tsuji ........................... | 702/139 |

* cited by examiner

Primary Examiner—Edward Lefkowitz
Assistant Examiner—Andre Allen
(74) Attorney, Agent, or Firm—Adams & Wilks

(57) ABSTRACT

To provide a movement-detecting altimeter designed so as to be capable of avoiding excessive accumulation of errors. The movement-detecting altimeter has a movement dependent altitude updating unit which updates an indicated altitude when a moving condition is maintained, and which avoids updating of the indicated altitude when the moving condition is not maintained. The movement dependent altitude updating unit has an estimated altitude computation section which obtains an estimated altitude by regarding as a change in altitude a variation in reference altitude obtained from the latest detected pressure value and the preceding detected pressure value obtained by a pressure detection unit when the moving condition is maintained, an abnormality determination section which makes a determination as to whether or not the estimated altitude is an abnormal value, and an altitude indication setting section which sets, as an altitude to be indicated, a designated altitude based on the reference altitude when the abnormality determination section determines that the estimated altitude is an abnormal value, and which sets the estimated altitude as an altitude to be indicated when the abnormality determination section determines that the estimated altitude is not an abnormal value.

8 Claims, 8 Drawing Sheets

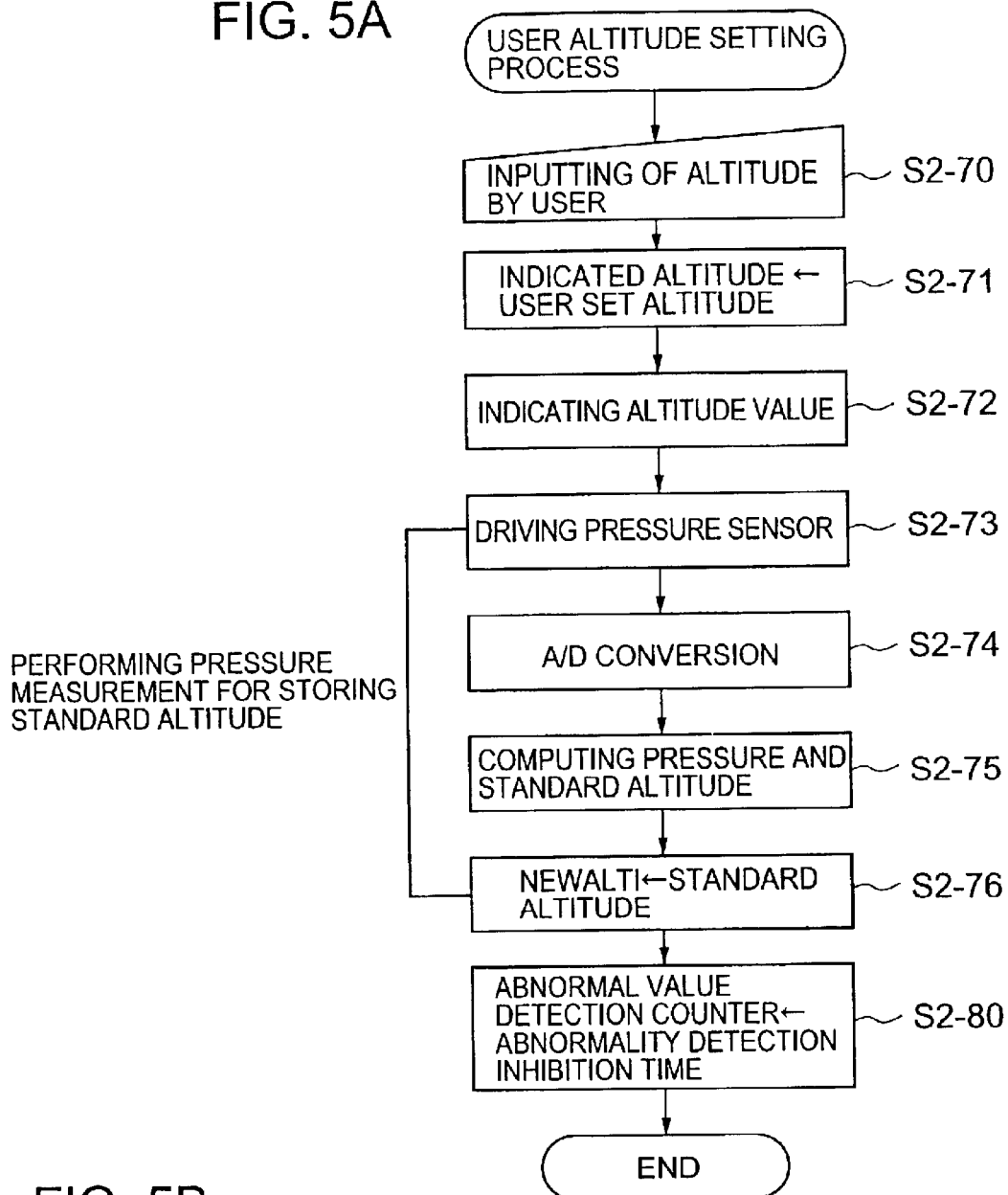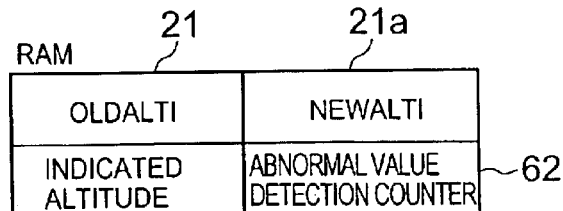

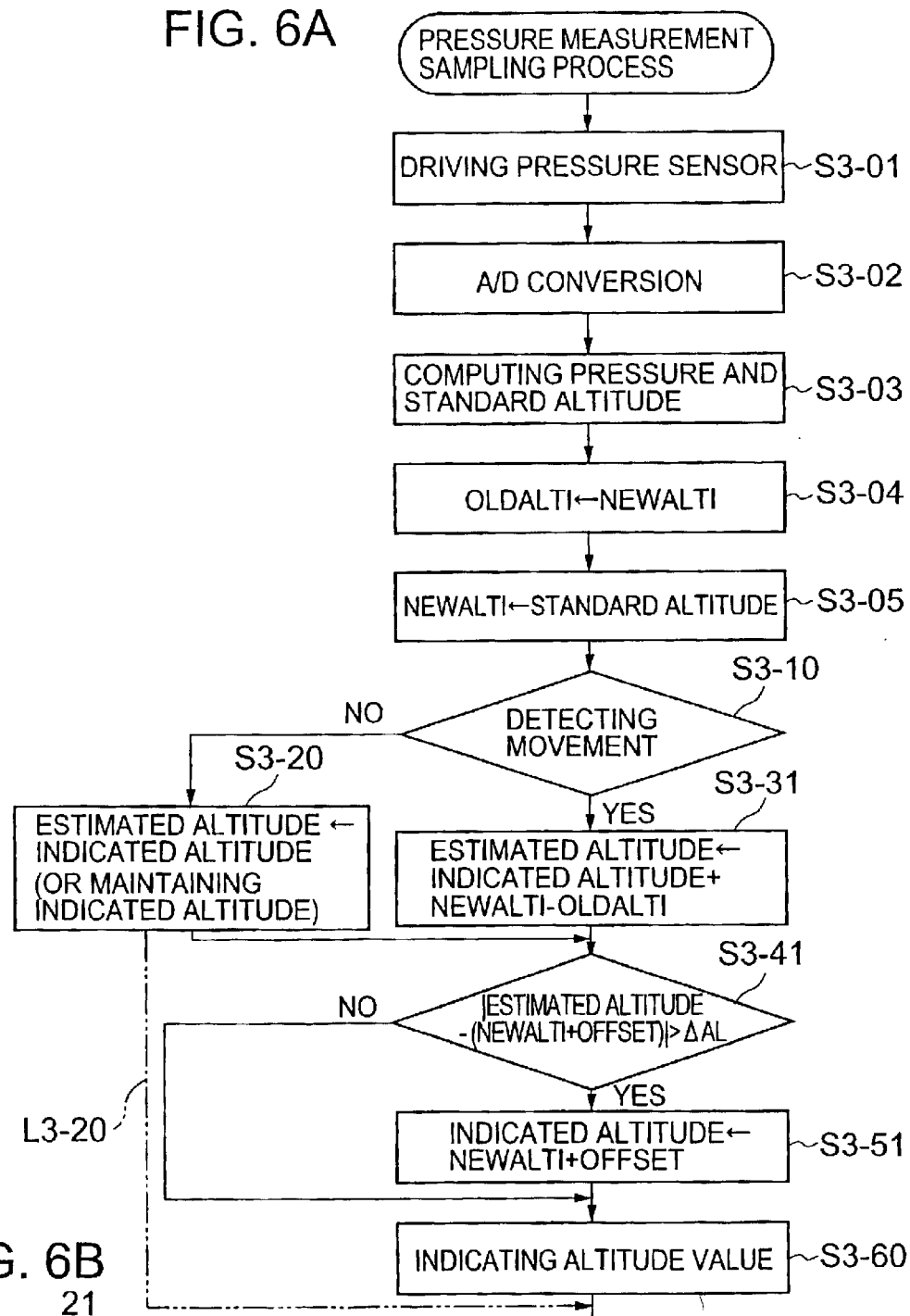

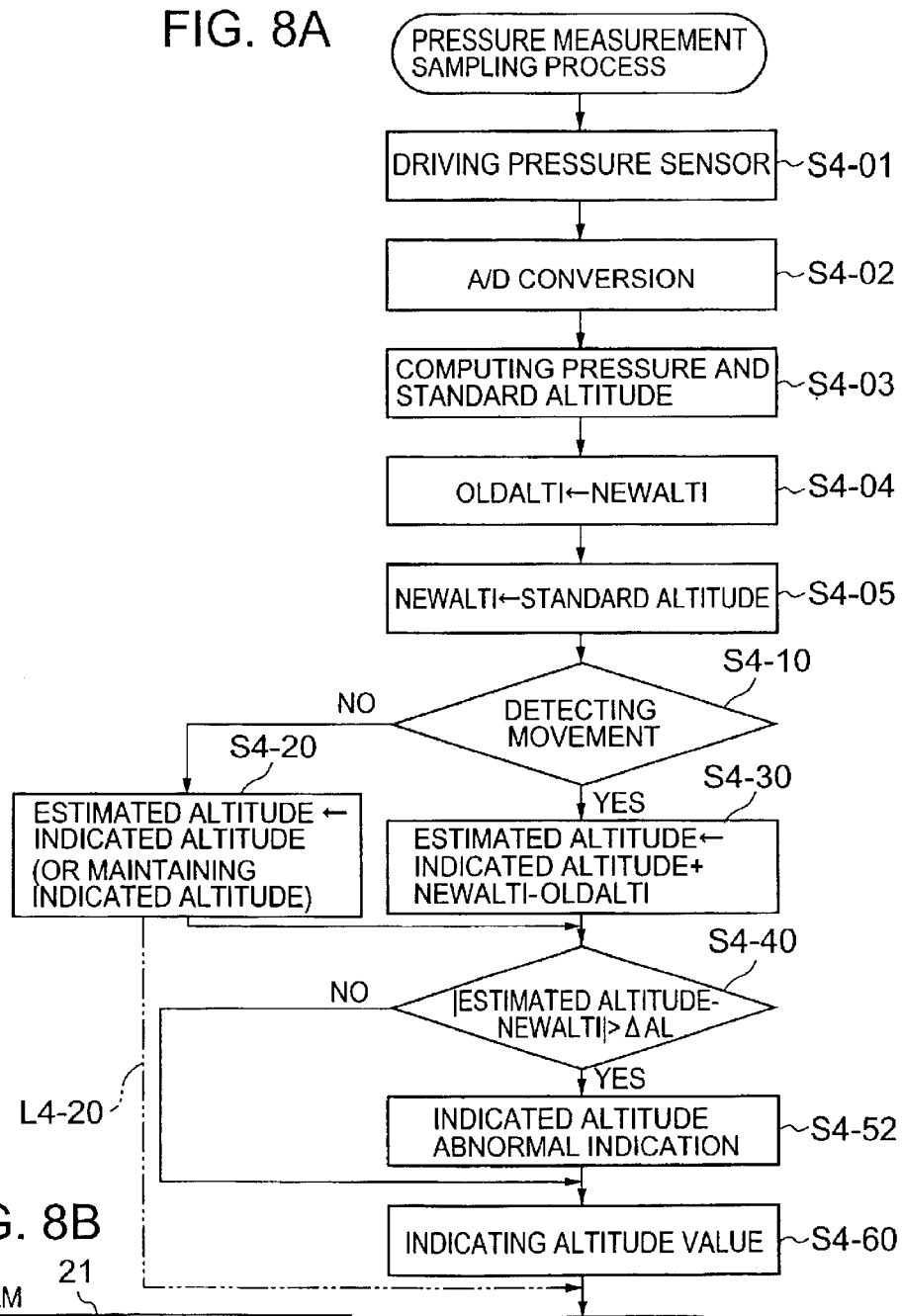

MOVEMENT-DETECTING ALTIMETER

BACKGROUND OF THE INVENTION

1. Field of the Invention

The present invention relates to an altimeter which detects the pressure of atmospheric air, and which obtains an altitude from the detected pressure value. More particularly, the present invention relates to a movement detecting type of (in other words, a stopped state detecting type of) altimeter which obtains an altitude while detecting movements in such a manner that the influence of variation in atmospheric pressure when there is no movement is minimized.

2. Description of the Prior Art

It is well known that an altitude is obtained from an atmospheric pressure detected with a pressure sensor by a standard pressure altitude conversion equation on the basis of a standard atmospheric pressure model which is formed by assuming that atmospheric air is an ideal gas, and in which a decrease by a 0.6 degree in temperature occurs with respect to every 100 m increase in altitude. It is also known that in actuality the pressure of atmospheric air is not constant and varies depending on weather, seasons, and time periods.

With respect to movement-detecting altimeters mounted on vehicles such as motor vehicles and bicycles, it is known that, by considering variations in atmospheric pressure depending on such factors, the influence of changes in atmospheric pressure is minimized in such a manner that while the altitude is obtained from atmospheric pressure by attributing a variation in the detected pressure value from a pressure sensor to a variation in altitude when the vehicle is moving, the altitude is regarded as constant even if the detected pressure value from the pressure sensor varies when the vehicle is stopped (e.g., JP 8-285582 A, JP 8-261755 A, and JP 2000-131061 A).

In this kind of movement-detecting altimeter, however, a variation in pressure in an atmosphere detected with the pressure sensor during moving is attributed to a change in altitude in practice, and, therefore, a variation in atmospheric pressure during moving is regarded as a change in altitude even when the atmospheric pressure itself varies, resulting in an error in measured altitude value. In many cases, the possibility of the influence of variation in atmospheric pressure being canceled out by averaging is high. In actuality, however, there is a possibility that errors resulting from variation in atmospheric pressure will be accumulated. For example, there is a certain degree of regularity in variation in atmospheric pressure in a day depending on the so-called sun effect. Therefore, errors can accumulate easily when there is a movement in a particular time period in a day. Similar error accumulation also occurs in a case where an atmospheric pressure change pattern and movement timing synchronize with each other.

Therefore, there is a possibility of peculiar accumulation of errors during a certain period in the movement-detecting altimeter operating as described above such that the altitude determined by the altimeter is largely different from the actual altitude. JP 2000-131061 refers to various efforts made to eliminate the influence of variation in atmospheric pressure. However, it is essentially difficult to solve similar problems as long as the difficulty in accurately detecting variation in atmospheric air in practice exists.

The present invention has been made in view of the above-described circumstances, and an object of the present invention is to provide a movement-detecting altimeter designed so as to be capable of avoiding excessive accumulation of errors.

SUMMARY OF THE INVENTION

In order to attain the above-mentioned object, a movement-detecting altimeter according to the present invention includes pressure detection means for detecting pressure of atmospheric air, reference altitude computation means for computing a reference altitude from a pressure detected by the pressure detection means, movement detection means for detecting whether or not a moving condition is maintained, and movement dependent altitude updating means for updating an indicated altitude when the moving condition is maintained, the movement dependent altitude updating means ordinarily avoiding updating of the indicated altitude when the moving condition is not maintained, the movement dependent altitude updating means having: estimated altitude computation means for obtaining an estimated altitude by regarding as a change in altitude a variation in reference altitude obtained by reference altitude computation means from the latest detected pressure value and the preceding detected pressure value obtained by the pressure detection means when the moving condition is maintained; abnormality determination means for making a determination as to whether or not the estimated altitude is an abnormal value; and altitude indication setting means for setting, as an altitude to be indicated, a designated altitude based on the reference altitude when the abnormality determination means determines that the estimated altitude is an abnormal value, and for setting the estimated altitude as an altitude to be indicated when the abnormality determination means determines that the estimated altitude is not an abnormal value.

The movement-detecting altimeter in accordance with the present invention is provided with "estimated altitude computation means for obtaining an estimated altitude by regarding as a change in altitude a variation in reference altitude obtained by reference altitude computation means from the latest detected pressure value and the preceding detected pressure value obtained by the pressure detection means when the moving condition is maintained" and is therefore capable of practical real-time gasping of a change in altitude accompanying a move. The movement-detecting altimeter in accordance with the present invention is also provided, in particular, with "abnormality determination means for making a determination as to whether or not the estimated altitude is an abnormal value" and "altitude indication setting means for setting, as an altitude to be indicated, a designated altitude based on the reference altitude when the abnormality determination means determines that the estimated altitude is an abnormal value". Therefore, if the accumulation of error becomes excessively large as the estimated altitude computation means repeats estimation to obtain estimated altitudes, a determination is made as to the existence of an abnormality value to check excessive accumulation of errors and to forcibly reset to the standard altitude at the corresponding time, thus grasping the altitude by removing the influence of an accumulated error. Therefore, while the advantage of the movement-detecting altimeter that the influence of variation in atmospheric pressure in a stationary condition is minimized is utilized, excessive accumulation of errors in indicated altitude peculiar to the movement-detecting altimeter (excessive accumulation of errors accompanying variation in atmospheric pressure during movement) can be avoided practically effectively.

The pressure detection means comprises a pressure sensor which is typically a piezoelectric element or a strain gage. The pressure sensor may be any transducer if the transducer is capable of directly or indirectly converting pressure into an electrical signal. Typically, the output signal from the pressure sensor is converted into a digital signal by an A/D converter by considering data processing. However, the output signal in the analog state may undergo data processing if necessary. Detection of pressure is performed at time intervals sufficiently shorter than the shortest time period in which variation in atmospheric pressure accompanying a change in altitude due to a move or variation in atmospheric pressure accompanying a change in weather, etc., can occur. Typically, detection of pressure is repeated at regular sampling intervals. If such a time interval requirement is satisfied, the pressure detection sampling (time) intervals may not be regular. The sampling intervals may be extremely short. However, for the purpose of minimizing the energy consumption such as power consumption, the sampling intervals may be set comparatively large provided that the above-described requirement is satisfied.

The reference altitude computation means obtains an altitude from pressure typically on the basis of the following (Equation 1) and (Equation 2) each time pressure detection is performed by the pressure detection means.

$$H=f(P) \quad \text{(Equation 1)}$$

$$f(P)=44332\{1-(P/1013.25)^{0.1903}\} \quad \text{(Equation 2)}$$

where P is a detected pressure in hectopascal (hPa), and H is an altitude in meters. This (Equation 2) is an atmosphere-altitude conversion equation specified by the International Civil Aviation Organization (ICAO) on the basis of the international standard atmosphere (ISA) model in which a decrease by a 6.5 degree in temperature occurs with respect to every 1000 m increase in altitude. In this specification, the altitude obtained in this manner will be referred to as standard altitude.

In actual atmosphere, atmospheric pressure varies under the influence of weather (high atmospheric pressure, low atmospheric pressure, typhoon, etc.), etc. For example, atmospheric pressure varies in the range from 990 hPa to 1030 hPa, i.e., by about plus or minus 20 hPa (by about plus or minus 150 m in terms of standard altitude) at a height of 0 m above the sea level at which the standard altitude is about 1013 hPa. Therefore, in the present invention, an amount of error corresponding to such a range is not regarded as in excess or excessively large.

The average atmospheric pressures in different regions on the earth may differ from each other even at the same altitude. Also, even in one region, the average atmospheric pressure may vary with respect to seasons. A user may previously make a setting and a correction by considering such variation in atmospheric pressure to achieve accurate altitude indication under certain restricted conditions. In such a case, on the basis of an altitude $H_0$ set by the user and standard altitude Hs obtained from (Equation 1) and (Equation 2) shown above, an offset $\Delta Hu$ is determined in advance by $$\Delta Hu=H_0-Hs \quad \text{(Equation 3)}$$

Also, $$He=Hs+\Delta Hu \quad \text{(Equation 4)}$$

that is, $$He=f(P)+\Delta Hu \quad \text{(Equation 5)}$$

An effective standard altitude He may be obtained from this (Equation 5) and (Equation 2) shown above, i.e., $$f(P)=44332\{1-(P/1013.25)^{0.1903}\} \quad \text{(Equation 2)}$$

From the above, a reference altitude Hk is defined which is formed by standard altitude Hs or effective standard altitude He.

The movement detection means may be designed so as to be suitable for detection of a moving or stopped state of a certain kind of object on which the altimeter is mounted, e.g., an automatically traveling vehicle such as a motor vehicle, a vehicle such as a bicycle, a thing worn on a person, etc. If it is used to detect a movement of vehicle, it may be a detector capable of directly or indirectly detecting revolutions of a wheel or an axle. On the other hand, to detect a movement of a walking person, a detector capable of detecting acceleration or inclinations, for example may be used. In any case, the movement detection means determines whether or not the object (a motor vehicle, a bicycle, or a walking person in the above-mentioned example) on which the altimeter is mounted is moving, and issues a movement detection signal if the object is moving. If the object is not moving, the movement detection means may output a signal indicating that the object is not moving (is stopped). Alternatively, it may simply stop transmitting the movement detection signal. Needless to say, it may issue a stoppage detection signal when the object is stopped and may stop outputting the stop detection signal when the object is not in the stopped state (is moving).

The movement dependent altitude updating means updates the indicated altitude if the result of movement detection by the movement detection means indicates that the object is in a moving state. Ordinarily, the movement dependent altitude updating means does not perform updating if the object is not moving. That is, when the object is not moving (when it in the stopped state), even if there is a variation in the pressure detected by the pressure detection means, the movement dependent altitude updating means regards this variation as due to a change in atmospheric pressure, and does not perform updating of the indicated altitude. For example, in a case where the stopped condition is maintained after initialization of the altimeter, the indicated altitude is maintained at the same value as that of the initial reference altitude regardless of the level of the detected pressure at the time of detection.

However, when the object is not moving, an altitude to be indicated may be estimated as a value which is considered to be constant, and abnormality determination processing may be performed which is similar to that performed in a case where there is a movement such as described below, while the indicated altitude value is unconditionally maintained (not updated). In a case where a considerably large amount of error is included in the indicated altitude, a determination is thereby made, for example, as to whether the difference between the indicated altitude and the reference altitude is so large as not to be ignored. If the difference exceeds a threshold value, the indicated altitude is forcibly changed to the reference altitude, for example. In such a case, "avoiding updating of the indicated altitude when the moving condition is not maintained" results. "Ordinarily" denotes a situation where the difference between the indicated altitude (estimated altitude) and the reference altitude does not exceed the threshold value.

On the other hand, when the object moves, indicated altitude updating processing is performed to follow a change in altitude accompanying the movement. Basically, this update processing is performed by the estimated altitude computation means under the supervision of the abnormality determination means. If an abnormality is determined, an indication setting is forcibly performed by the altitude indication setting means.

The estimated altitude computation means obtains an estimated altitude by regarding as a change in altitude a variation in reference altitude obtained from the latest detected pressure value and the preceding detected pressure value obtained by the pressure detection means when the moving condition is maintained. Typically, the "preceding" detected pressure value is the immediately preceding detected pressure value. However, if variations which cannot be ignored occur due to some kind of noise in the detected pressure values obtained at different times, each detected pressure value may be replaced with a different value such as a moving average value obtained from the corresponding pressure value and a plurality of the detected pressure values before and after this pressure value. As "variation", typically "difference" is used. However, a different quantity such as "deviation from this point" may be used if necessary.

That is, when the moving condition is maintained, if the pressure at the ith sampling time $t_i$ is $P_i$, typically $Hk_i=Hs_i=f(P_i)$ with the assumption that the reference altitude Hk coincides with standard altitude Hs. Also, $Hk_i=Hs_i+\Delta Hu=f(P_i)+\Delta Hu$ with the assumption that the reference altitude Hk coincides with the effective standard altitude He. In either case, a change in altitude $\Delta H$ is $$\Delta H=Hk_i-Hk_{i-1}=f(P_i)-f(P_{i-1}) \quad \text{(Equation 6)}$$

Accordingly, when the moving condition is maintained, an estimated altitude Ha is typically obtained by the following equation on the basis of the indicated altitude Hd determined and indicated at the immediately preceding sampling time.

$$Ha = Ha_i = Hd_{i-1} + \Delta H \quad \text{(Equation 7)}$$
$$= Hd_{i-1} + \{f(P_i) - f(P_{i-1})\}$$

The estimated altitude Ha does not depend directly on use of one of the standard altitude Hs and the effective standard altitude He as reference altitude Hk. However, the indicated altitude $Hd_{i-1}$ set at the immediately preceding sampling time ordinarily depends on use of one of the standard altitude Hs and the effective standard altitude He as reference altitude Hk. Therefore the indicated altitude $Hd_i$ or $Hd_{i-1}$ reflects the influence of the selection of the standard altitude Hs or the effective standard altitude He.

The above-described computation of estimated altitude Ha by the estimated altitude computation means involves the risk of accumulating errors. That is, for example, in the estimated altitude computation means, all the differences between pressures $P_i$ and $P_{i-1}$ obtained at two consecutive sampling times while movement is continued are attributed to changes $\Delta H$ in altitudes. Therefore, if a change occurs in atmospheric pressure accompanying a change in weather or due to the sun effect, the entire change is incorporated as an estimated altitude difference. For this reason, if the time period during which altitude estimation is performed by the estimated altitude computation means and the time period during which an increasing (or decreasing) trend of atmospheric air is exhibited coincide cumulatively with each other from start to end, the change in atmospheric pressure corresponding to the trend results directly in an error in estimated altitude. The possibility of such an accumulation or error is particularly high, for example, in a case where the frequency of moves made in a time period in a day during which an increasing (or decreasing) trend of atmospheric pressure due to the sun effect is exhibited is much higher than the frequency of moves made in another time period during which a decreasing (or increasing) trend of atmospheric pressure is exhibited, or in a case where moves are made at a high frequency when there is either an increasing trend or decreasing trend of atmospheric pressure.

The abnormality determination means detects as an abnormality an abnormally high or an abnormally low value of estimated altitude Ha due to such accumulation of error, thus making a determination as to whether or not estimated altitude Ha is an abnormal value.

Typically, the abnormality determination means compares estimated altitude Ha with reference altitude Hk at the corresponding time and checks whether the difference therebetween, the magnitude of $\Delta Hak=Ha-Hk$ exceeds the reference value, i.e., a threshold value C, thereby determining whether or not estimated altitude Ha is an abnormal value. As threshold value C, a suitable value C1 of about $\{f(1030)-f(990)\}/2$, for example is used. If, for example, $C=\alpha C1$, $\alpha$ is about 1 to 3, e.g., 1 or 2. Threshold value C may be varied with respect to regions, seasons, etc. The value of $\alpha$ may be increased with a lapse of time from a start of movement (e.g., the number of sampling times) to allow an increase in uncertainty to some extent. Abnormality determination using the abnormality determination means is made to determine whether there is a deviation in estimated altitude exceeding a deviation in estimated altitude corresponding to ordinary variation in atmospheric pressure accompanying an ordinary change in weather. In comparison of variation, a ratio (Ha/Hk) may be used in place of difference (Ha−Hk) (needless to say, threshold value C is determined in advance with respect to the magnitude of ratio). In such a case, even if there is variation in average atmospheric pressures with respect to seasons for example, the influence of seasonal variation on the determination result is comparatively small.

The sum of standard altitude Hs and a variable offset level (or the product of these values), for example may be used as the value for comparison with estimated altitude Ha in the abnormality determination means. This variable offset level (referred to as baseline variable $\Delta Hb$ herein) may represent, for example, an atmospheric pressure variation pattern or trend obtained on the basis of at least one of factors: an atmospheric air variation trend in a stoppage period including a point in time immediately before a start of moving (period during which there is no movement), a variable pattern having a period in a day, and seasonal variation. Data on such variations may be computed from measured values measured immediately before, e.g., from a trend immediately before, or may be data organized in a predetermined form and stored in data storage means, e.g., data depending on regions of seasons, or data on the sun effect useful in a wider range. Also, if generally real-time weather information for neighboring regions can be obtained, such atmospheric pressure variation information may be used. Although such atmospheric pressure variation information is not suitable for use in absolute-value form, variation of its relative value, a variation pattern therein or the extent of variation therein may be incorporated in the baseline variable value.

The altitude indication setting means sets, as altitude Hd to be indicated, a designated altitude based on reference altitude Hk if the abnormality determination means determines an abnormal value by recognizing excessive accumulation of errors in estimated altitude Ha. Typically, reference altitude Hk itself is designated as altitude Hd to be indicated. The possibility of this reference altitude Hk deviating excessively largely from the actual altitude is extremely low because of the definition expressed in (Equation 1) and (Equation 5) shown above. Therefore the probability thereof is high as long as a certain amount of error is accepted in practice. However, while reference altitude Hk is used as a basic reference, a baseline variable ΔHb such as that described above may be added to designate Hk+ΔHb as altitude Hd to be indicated. There is a possibility that addition of this baseline variable ΔHb causes a somewhat increase in error. However, baseline variable ΔHb itself has no effect of cumulatively increasing error. Also with respect to this case, the probability can be said to be high if a certain amount of error is accepted.

The altitude indication setting means sets an estimated altitude as an altitude to be indicated when the abnormality determination means does not make abnormal value determination. If the movement-detecting altimeter does not have the abnormality determination means, that is, does not evaluate an error, such a setting itself may be a cause of accumulation of error. The movement-detecting altimeter having the abnormality determination means is capable of avoiding excessive accumulation of errors by the abnormality determination means. As long as the estimated altitude is within a practically appropriate range, a change in pressure during movement can be taken in as a change in altitude to be included in the altitude indication value (indicated altitude).

Typically, on atmospheric pressure data detected at predetermined sampling intervals as described above, abnormality determination by the abnormality determination means is made each time the data is obtained. However, timing of abnormality determination may be positively controlled if necessary. Such abnormality determination timing control may be generally considered to be control by abnormality determination control means. This abnormality determination control means may be arranged to suspend abnormality determination processing by the above-described determination means for a predetermined time period, for example, after a time when a user sets an altitude value, instead of making the above-described determination means perform abnormality determination at certain sampling intervals. It is thought that when a user dare to set an altitude value, the user makes a setting on the basis of reliable information or makes a special setting by considering special weather conditions for example. It is also thought that atmospheric pressure does not change abruptly under ordinary conditions and therefore an offset value adjusted when a user makes atmospheric pressure setting may function effectively for a substantially long time. For this reason, the above-described arrangement may be adopted. Also, abnormality determination timing may be controlled in such a manner that after the indicated altitude has been temporarily adjusted to a reference altitude or the like according to the result of abnormality determination performed by the abnormality determination means, the subsequent intervals for performing abnormality determination may be increased, for example, abnormality determination may be performed one time in a week or in a day.

The arrangement may be such that when an abnormality value is determined by abnormality determination means, the altitude indicating setting means does not initialize or reset the indicated altitude but alarm means notifies a user of the determination result. In this case, the movement dependent altitude updating means has "estimated altitude computation means for obtaining an estimated altitude by regarding as a change in altitude a variation in reference altitude obtained from the latest detected pressure value and the preceding detected pressure value obtained by the pressure detection means when the moving condition is maintained; abnormality determination means for making a determination as to whether the estimated altitude is an abnormal value; and alarm means for notifying a user that an abnormality determination is made when the abnormality determination means determines an abnormal value". An operation mode designation means such as a pushbutton switch may be provided to enable selective designation of a state in which the movement dependent altitude updating means includes the altitude indication setting means, and a state in which the movement dependent altitude updating means includes the alarm means. The arrangement may alternatively be such that the movement dependent altitude updating means includes both the alarm means and the altitude indication setting means, and that while alarming is performed, the indicated altitude setting processing is continued by the altitude indication setting means.

The movement-detecting altimeter may be a type mounted on a vehicle or a type carried by a person, or may be provided in other forms.

BRIEF DESCRIPTION OF THE SEVERAL VIEWS OF THE DRAWINGS

A preferred form of the present invention is illustrated in the accompanying drawings in which:

FIG. 2A is a flowchart of the operation; and FIG. 2B is a diagram schematically showing relating main work areas;

FIG. 4 are the operation of a movement-detecting altimeter according to a second preferred embodiment of the present invention.

FIG. 5 are setting processing and abnormality processing inhibition interval setting steps performed by a user in the operation of the movement-detecting altimeter according to the second preferred embodiment of the present invention; FIG. 5A is a flowchart of relating processing steps; and FIG. 5B is a diagram schematically showing relating main work areas;

FIG. 6 are the operation of a movement-detecting altimeter according to a third preferred embodiment of the present invention; FIG. 6A is a flowchart of the operation; and FIG. 6B is a diagram schematically showing relating main work areas;

FIG. 7 are initialization setting processing steps performed by a user in the operation of the movement-detecting altimeter according to the third preferred embodiment of the present invention; FIG. 8 are the operation of a movement-detecting altimeter according to a fourth preferred embodiment of the present invention; FIG. 8A is a flowchart of the operation;

and FIG. 8B is a diagram schematically showing relating main work areas.

DETAILED DESCRIPTION OF THE PREFERRED EMBODIMENTS

Several preferred modes of implementation of the present invention will be described on the basis of preferred embodiments shown in the accompanying drawings.

[Embodiments]

Figure 1:
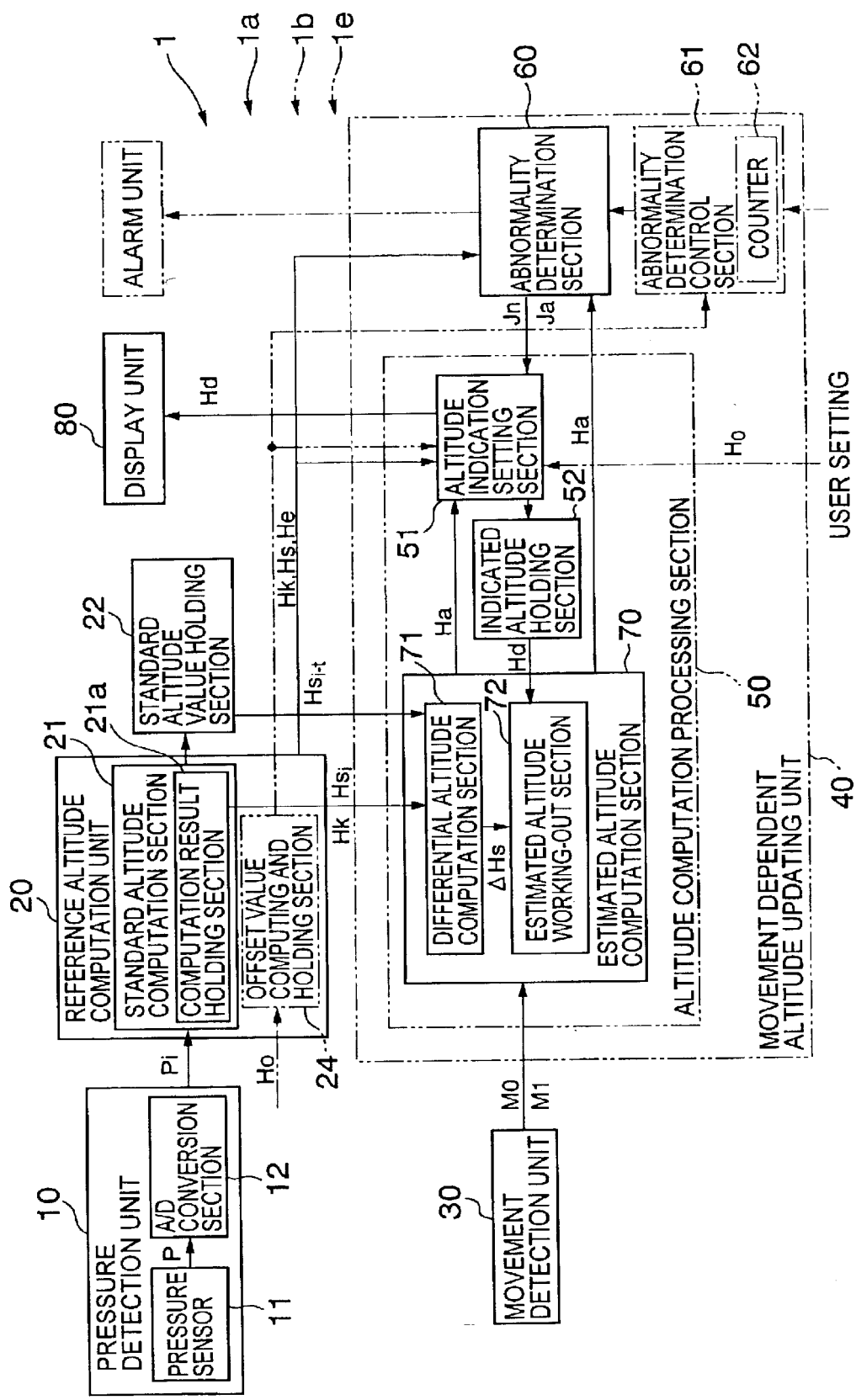
FIG. 1 is a block diagram of a movement-detecting altimeter according to a preferred embodiment of the present invention.
Figure 2:
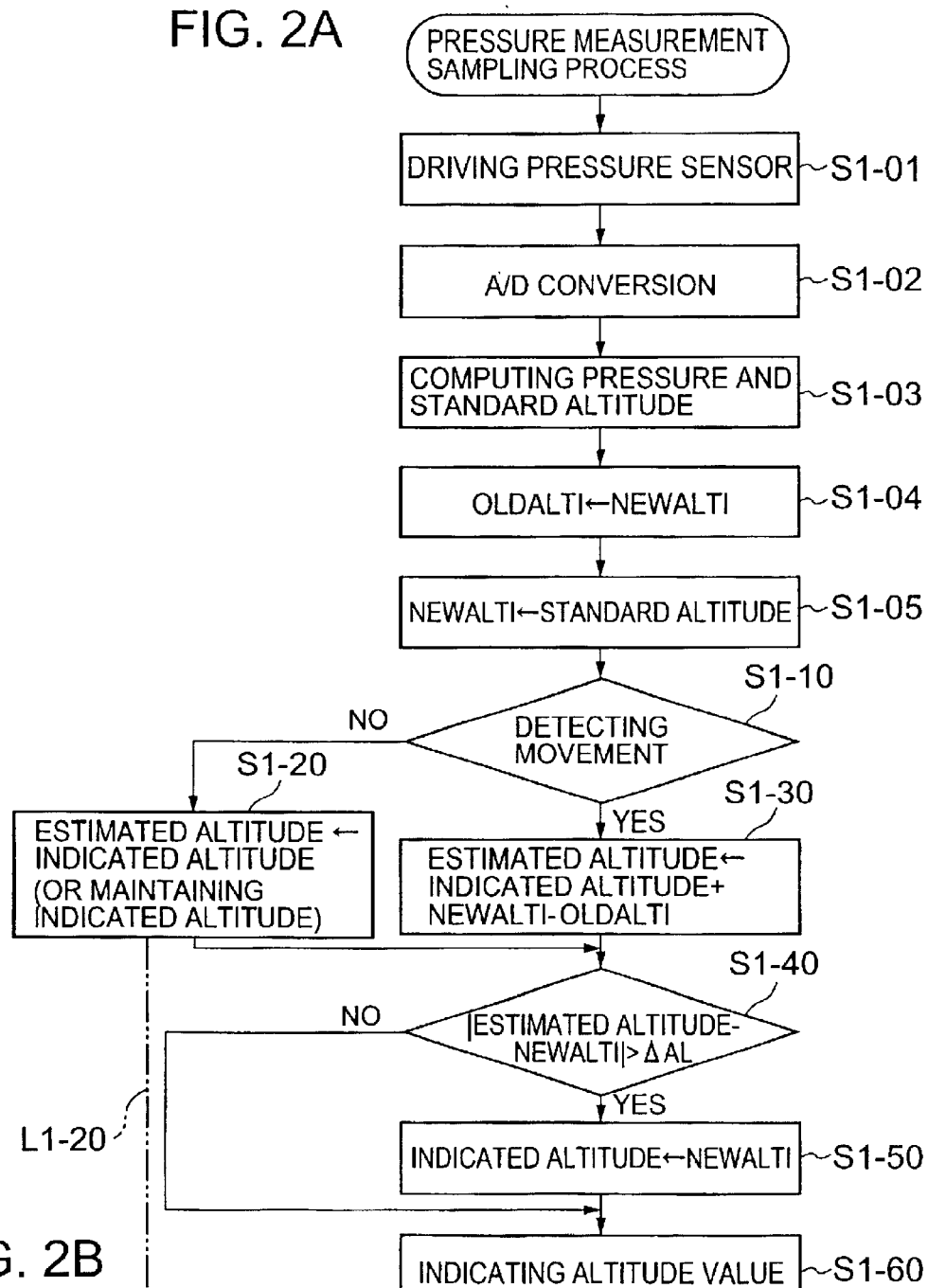
FIG. 2 are the operation of the movement-detecting altimeter according to a first preferred embodiment of the present invention.

FIG. 1 and FIGS. 2A and 2B are a functional block diagram of a movement detecting altimeter 1 according to a first preferred embodiment of the present invention, a flowchart of the operation of the altimeter, and a diagram showing relating main work areas (data holding sections). This altimeter 1 has a pressure detection unit 10, a reference altitude computation unit 20, a movement detection unit 30, a movement dependent altitude updating unit 40, and a display unit 80.

The pressure detection unit 10 includes a pressure sensor 11 which senses atmospheric pressure (pressure of air in atmosphere) P, and an A/D conversion section 12 in which analog/digital (A/D) conversion of the magnitude P of pressure sensed by the pressure sensor 11 is performed at predetermined sampling intervals and the pressure value sampled at the ith sampling time is converted into digital data $P_i$. The pressure sensor 11 may be of any type if it is a transducer which, on the whole, converts a pressure signal into an electrical signal. Any type of pressure sensor 11 suitable for operation in a certain place may be selected by considering the size of a space in which it is placed, its power consumption, the required level of power supply voltage, stability with respect to oscillation of detected pressure, etc. Typically, the sampling intervals are constant. However, it is not necessary that the sampling intervals be strictly constant if the sampling time intervals are sufficiently short in comparison with the shortest time in which atmospheric pressure can change substantially or the shortest time in which the pressure of air in an atmosphere can change substantially by a change in altitude accompanying a move. Typically, sampling may be repeated each time execution of a control sequence or a computation processing program is completed. Also, sampling timing control may be performed on pressure detection with the pressure sensor 11 or on A/D conversion by the A/D conversion section 12.

The reference altitude computation unit 20 includes a standard altitude computation section 21 which converts the detected pressure value $P_i$ from the pressure detection unit 10 into a standard altitude $Hs_i$ as a reference altitude $Hk_i$. More specifically, the standard altitude computation section 21 obtains standard altitude $Hs_i$ from detected pressure value $P_i$ by the following equation:

$$Hs_i = f(P_i) \quad \text{(Equation 11)}$$

Here, $$f(P_i) = 44332\{1-(P_i/1013.25)^{0.1903}\} \quad \text{(equation 12)}$$

where $P_i$ is a detected pressure value sampled in hPa, and $Hs_i$ is an altitude in meters. This is an atmosphere-altitude conversion equation specified by the ICAO on the basis of the international standard atmosphere model. The altitude thus obtained is referred to as "standard altitude" in this specification. However, if a conversion equation higher in accuracy with respect to the relationship between atmospheric pressure P and altitude H can be obtained, for example, by putting restrictions on regions and seasons or by incorporating other factors in the international standard atmosphere model, altitude H obtained by such a conversion equation may be regarded as standard altitude Hs.

Each time the standard altitude computation section 21 is supplied with the latest detected pressure value $P_i$ obtained as the ith sampled value at time $t_i$ (in the following, the value sampled at time $t_1$, the ith sample value or the value sampled at the ith time or a computed value related to it is shown with a suffix i, or only the variable name without a suffix is shown when the corresponding value is expressed in a general form or when distinction with respect to the time or the ordinal number as not made), it stores in a standard altitude holding section 22 the immediately preceding standard altitude $Hs_{i-1}$ obtained from the immediately preceding detected pressure value $P_{i-1}$, obtains the standard altitude $Hs_i$ from the detected pressure value $P_i$, and holds the result in a computation result holding section 21a. Either of the storage of the immediately preceding standard altitude $Hs_{i-1}$ in the standard altitude holding section 22 and the computation of the new standard altitude $Hs_i$ may precede the other.

The movement detection unit 30 detects whether an object to which the altimeter 1 is attached or mounted is moving. If the object is moving, the movement detection unit 30 issues a movement detection signal M1 which indicates that the object is moving. If the object is not moving, the movement detection unit 30 issues a stoppage detection signal M0 which indicates that the object is stopped. In the following, for ease of explanation, the description is made by assuming that the movement detection signal M1 is issued when a movement is detected and that the stoppage detection signal M0 is issued when stoppage is detected. However, if the movement dependent altitude updating unit 40 is capable of determining one of movement or stoppage as the present state when the stoppage or movement detection signal is not issued from the movement detection unit 30, it is not necessary to issue one of the movement detection signal M1 and the stoppage detection signal M0.

If the altimeter 1 is mounted on a vehicle, a detector for detecting revolutions of a wheel or an axle for example is used as the movement detection unit 30. If the altimeter 1 is worn on a person, a sensor such as a movement detection portion of a pedometer for sensing acceleration, vibration or an inclined state is used as the movement detection unit 30. Any other detector or sensor may be used as the movement detection unit 30 if it is sufficiently capable of correctly grasping the moving state (or stopped state) of the object to which the altimeter 1 is attached.

When the movement dependent altitude updating unit 40 receives the stoppage detection signal M0 from the movement detection unit 30, it does not perform processing for updating indicated altitude Hd. That is, when the object to which the altimeter 1 is attached is in the stopped state, updating of indicated altitude Hd is not performed since the altitude H of the object must be unchanged irrespective of the existence/nonexistence of variation in reference altitude Hk obtained by the reference altitude computation unit 20. On the other hand, when the movement dependent altitude updating unit 40 receives the movement detection signal M1 from the movement detection unit 30, it performs processing for updating indicated altitude Hd.

More specifically, the movement dependent altitude updating unit 40 includes an altitude computation processing section 50 and an abnormality determination section 60. With respect to estimated altitude Ha obtained by the altitude computation, the abnormality determination section 60 determines whether the obtained value is abnormal (conversely, whether the obtained value is within a proper range). The altitude computation processing section 50 determines an altitude value Hd to be indicated on the display unit 80 according to the result of determination made by the abnormality determination section 60.

That is, the altitude computation processing section 50 includes an estimated altitude computation section 70 which performs altitude estimation to obtain estimated altitude Ha, and an altitude indication setting or determination section 51 which sets or determines the optimum altitude indication value Hd as the current altitude value to be indicated. The altitude indication setting section 51 sends the determined altitude value Hd to be indicated to the display unit 80 to indicate the value. The altitude indication setting section 51 is accompanied by an indicated altitude holding section 52 in which the value of the indicated altitude $Hd_{i-1}$ immediately preceding the ith altitude $Hd_i$ to be newly set and indicated (in other words, the altitude indicated when the new altitude $Hd_i$ to be indicated is set) is stored. When the new altitude $Hd_i$ to be indicated is determined and set, the altitude $Hd_i$ thereby set to be indicated is written in the indicated altitude holding section 52 to enable computation of the next estimated altitude $Ha_{i+1}$. However, before the determination of the new altitude $Hd_i$ to be indicated, the indicated altitude $Hd_{i-1}$ currently being indicated may be written.

The estimated altitude computation section 70 includes a differential altitude computation section 71 and an estimated altitude working-out section 72. When the differential altitude computation section 71 is given the movement detection signal M1 from the movement detection unit 30, it obtains a differential altitude ΔHs by the following equation (equation 13) from the standard altitude value $Hs_i$ on the basis of the latest sampling result obtained by the standard altitude computation section 21, and the standard altitude value $Hs_{i-1}$ based on the immediately preceding sampling result stored in the standard altitude value holding section 22.

$$\Delta Hs = Hs_i - Hs_{i-1} \quad \text{(Equation 13)}$$

This differential altitude or altitude difference ΔHs is assumed to indicate a change in altitude (an increase or decrease in altitude) accompanying the latest movement.

The estimated altitude working-out section 72 obtains an estimated altitude $Ha_i$ by the following equation (equation 14), i.e., by adding the differential altitude ΔHs obtained by the differential altitude computation section 71 to the indicated altitude $Hd_{i-1}$ stored in the indicated altitude holding section 52 at the corresponding time (at a time immediately before computation of the new altitude $Hd_i$ to be indicated).

$$Ha_i = Hd_{i-1} + \Delta Hs \quad \text{(Equation 14)}$$

The abnormality determination section 60 compares the estimated altitude $Ha_i$ obtained by the estimated altitude computation section 70 and the standard altitude $Hs_i$ obtained as reference altitude $Hk_i$ by the reference altitude computation unit 20, and determines whether or not a difference ΔHak defined by the following equation (equation 15) is equal to or smaller than a reference threshold value C.

$$\Delta Hak = Ha_i - Hk_i = Ha_i - Hs_i \quad \text{(Equation 15)}$$

If the difference ΔHak is equal to or smaller than the reference threshold value C, that is, $$\Delta Hak \leq C \quad \text{(Equation 16)}$$

the abnormality determination section 60 determines that the estimated altitude $Ha_i$ is within the normal-value range, and sends a normality determination signal Jn to the altitude setting section 51 in the altitude computation processing section 50. On the other hand, if the difference ΔHak is larger than the reference threshold value C, that is, $$\Delta Hak > C \quad \text{(Equation 17)}$$

the abnormality determination section 60 determines that the estimated altitude $Ha_i$ is an abnormal value exceeding the normal-value range, and sends an abnormality determination signal Ja to the altitude setting section 51 in the altitude computation processing section 50.

When the altitude indication setting section 51 receives the normality determination signal Jn from the abnormality determination section 60, it determines the estimated altitude $Ha_i$ as altitude $Hd_i$ to be indicated, and sends the altitude $Hd_i = Ha_i$ to be indicated to the display unit 80 to indicate the altitude. On the other hand, when the altitude indication setting section 51 receives the abnormality determination signal Ja from the abnormality determination section 60, it determines the standard altitude $Hs_i$ as altitude $Hd_i$ to be indicated, and sends the altitude $Hd_i = Hs_i$ to be indicated to the display unit 80 to indicate the altitude.

The arrangement may be such that the abnormality determination section 60 itself supplies the altitude indication setting section 51 with the estimated altitude Ha when ΔHak ≤ C and supplies the altitude indication setting section 51 with the standard altitude $Hs_i$ when ΔHak > C. In such a case, the altitude indication setting section 51 may be arranged to send the altitude from the abnormality determination section 60 to the display unit 80 as altitude $Hd_i$ to be indicated. In this case, the altitude indication setting section 51 evaluates information supplied thereto in such a manner as to consider information $Hs_i$ from the abnormality determination section 60 as abnormality detection (determination) signal Ja and information $Hd_i$ as normality determination signal Jn.

In the above-described arrangement shown in the functional block diagram, the pressure sensor 11 and the A/D conversion section 12 in the pressure detection unit 10, the movement detection unit 30, and the display unit 80 are respectively constituted by devices such as a pressure sensor, an A/D converter, a movement sensor, and a display panel. On the other hand, the reference altitude computation unit 20 and the movement dependent altitude updating unit 40, including the standard altitude holding section 22, i.e., the group of these units and section as a whole, are constituted by a microprocessor, related programs and data, a storage for storing programs and data (memories such as a RAM and a ROM or other auxiliary storage means). Also, the pressure sensing operation and A/D conversion operation of the pressure sensor 11 in the pressure detection unit 10 and the A/D conversion section 12 are under the control of the microprocessor or a control program executed by the microprocessor, although this control is not shown in FIG. 1.

The operation of the altimeter 1 shown in FIG. 1 will be described in detail with reference to the flowchart of FIG. 2A. FIG. 2B shows work areas (data holding sections) for essential sorts of data used in the flowchart.

When there is no variation in atmospheric pressure with respect to time and when atmospheric pressure is dependent on the altitude in a certain relationship, there is essentially no possibility of an error problem or the like except the problem of error in the measuring system itself. By considering this, the operation of the altimeter 1 shown in FIG. 1 will be described with respect to a case where atmospheric pressure changes with time with reference to the flowchart of FIG. 2A.

The operation will be described by way of example with respect to a particular case where accumulation of errors can occur easily if the abnormality determination section 60 does not exist. As a simplest instance, a case where atmospheric pressure changes periodically every day but has no day-to-day variation will be discussed. Needless to say, the altimeter 1 can function advantageously not only in such a simple situation but also in a situation where any other variation in atmospheric pressure can occur. For example, if there is a trend in variation in atmospheric pressure (one of an increase and decrease with time), the trend may be added (simply superimposed in a small-variation range). If increases and decreases at different rates appear mixedly with time as in ordinary cases, increasing trends and decreasing trends may be successively added (simply superimposed in a small-variation range). Further, a case where a move is made at a constant altitude will be discussed as a simplified instance. If a change occurs in altitude accompanying a move, the change in atmospheric pressure accompanying the change in altitude may be added (simply superimposed in a small-variation range). In the following, therefore, the influence of variation in atmospheric pressure with time on the altitude indicated on the altimeter in a case where atmospheric pressure changes periodically every day and a move is made at a constant altitude.

Figure 3:
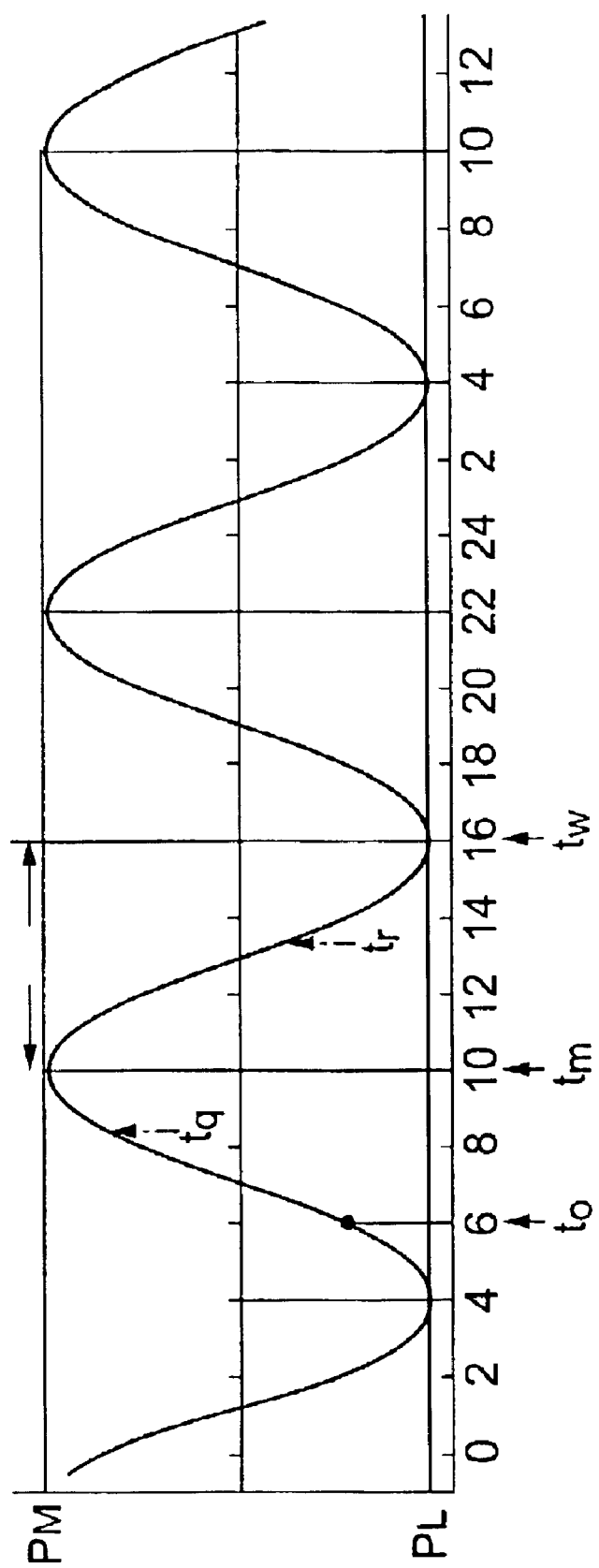
FIG. 3 is a graph schematically showing time dependence of atmospheric pressure.

FIG. 3 shows a state in which atmospheric pressure changes periodically every day. In the example shown in FIG. 3, further simplified conditions are set such that atmospheric pressure has a minimum value $P_m$ at 4:00 and 16:00 and a maximum value $P_M$ at 10:00 and 22:00 and the two minimum and maximum values are equal to each other respectively. In a case where a move is made in a region of a constant altitude, the detected pressure is influenced only by periodic changes in atmospheric pressure since it is free from the influence of altitude dependence of atmospheric pressure.

For example, a pushbutton switch or the like is pressed at 6:00 a.m. to start the altimeter 1. This start time is time $t_0$. It is also assumed that moves are repeatedly made from 10:00 a.m. to 4:00 p.m. and no move is made in other time periods (stopped).

By the altimeter 1 start instruction at time $t_0$ (6:00 a.m.), initialization processing is performed in the altimeter 1. For example, the computation result holding section 21a in the standard altitude computation section 21 of the reference altitude computation unit 20 is reset to 0. At this time, since no move is made, stoppage detection signal M0 is output from the movement detection unit 30.

By the start instruction, pressure detection with the pressure sensor 11 is initiated (corresponding to step S1-01 in FIG. 2A (since the flowchart of FIG. 2A is not a flowchart showing initialization processing, each processing step corresponding to initialization is designated by "corresponding to"). A detected pressure value at a first sampling time $t_1=t_{i=0}$ is obtained. The sampling time interval is assumed to be one minute in this example. However, the sampling time interval may be increased (for example, to about five minutes or several ten minutes) as long as it is shorter the shortest time period in which a substantial change in altitude is caused by a movement of the object. Also, the sampling time interval may be reduced (for example, to several seconds) as long as there is no problem relating to power consumption, such as the problem of exhaustion of a battery for the pressure gauge 1. At start-up, however, a start instruction is typically given as a first sampling instruction subsequent to a predetermined initialization instruction such as a reset instruction even if the sampling time interval is long.

Detected pressure P is A/D converted by the A/D conversion section 12 to be obtained as detection output digital data $P_0=P_{i=0}$ (corresponding to step S1-02). Sampled values of digital pressure data may be obtained by continuously outputting the analog pressure value from the pressure sensor 11 and setting timing of A/D conversion in the A/D conversion section 12 as sampling timing instead of converting in the A/D conversion section 12 the analog value of pressure obtained by sampling.

Sampled pressure data $P_{i=0}$ obtained is supplied to the reference altitude computation unit 20, and corresponding standard altitude $Hs_{i=0}$ is computed by the standard altitude computation section 21 (corresponding to step S1-03). Subsequently, held data (initial value 0 at this stage) is sent from the computation result holding section 21a in the standard altitude computation section 21 to the standard altitude holding section 22 (that is, the standard altitude obtained by the immediately preceding measurement is saved) (corresponding to step S1-04), and standard altitude $Hs_{i=0}$ newly computed by the standard altitude computation section 21 is stored in the computation result holding section 21a (corresponding to step S1-05).

Subsequently, movement determination is made (corresponding to step S1-10). That is, a determination is made as to whether the signal from the movement detection unit 30 is movement detection signal M1 or stoppage detection signal M0. If this signal is movement detection signal M1, estimated altitude computation processing is started. In this situation, however, stoppage detection signal M0 is issued and not the estimated altitude computation processing but step S1-20 is started. For example, the function for this movement determination (corresponding to step S1-10) is provided in the estimated altitude computation section 70 among the sections shown in the block diagram of FIG. 1.

In (corresponding) step S1-20, processing in the estimated altitude computation section 70 is basically such that the immediately preceding indicated altitude Hd is taken in as estimated altitude Ha, just as it is, and processing of $Ha_i \equiv Hd_{i-1}$ is performed in the estimated altitude working-out section 72 in the estimated altitude computation section 70. Insofar as the first measurement is concerned, standard altitude $Hs_{i=0}$ first computed and held in the computation result holding section 21a in the standard altitude computation section 21 is stored as the immediately preceding indicated altitude $Hd_{i=0-1}$ in the indicated altitude holding section 52 related to the altitude indication setting section 51, although this operation is not shown in the flowchart of FIG. 2. Thereafter, processing of $Ha_i \equiv Hd_{i-1}$, i.e., processing of $Hs_{i=0}$ by $Ha_{i=0}=Hd_{i=0-1}$, is performed by the estimated altitude working-out section 72.

Subsequently, in the abnormality determination section 60, abnormality determination processing is performed to determine whether or not the estimated altitude Ha is an abnormal value (corresponding to step S1-40). That is, a determination is made as to whether or not Ha>C. If the measurement is assumed to have been started under a suitable atmospheric pressure condition, it is determined that $Ha \leq C$ and the process moves to step S60. Estimated value $Ha_{i=0}$ corresponding to the immediately preceding indicated value $Hd_{i=0-1}$ is then adopted as altitude $Hd_{i=0}$ to be indicated in the altitude indication setting section 51 and is indicated on the display unit 80 by assuming that Hd=Ha, i.e., $Hd_{i=0}=Hd_{i=0-1}=Hs_{i=0}$. Estimated value $Ha_{i=0}$ is also stored in the indicated altitude holding section 52 as indicated altitude at subsequent time to when i=0 (that is, it is used at the time $t_{i=1}$ when i=1 as indicated altitude $Hd_{i=0}$ at the immediately preceding time $t_{i=1-1}=t_{i=0}$ when i=0). This processing is performed to achieve highest similarity to the subsequent repetitive processing. However, since HsHs$_{i=0}$ has already been stored in the indicated altitude holding section 52, processing for storing the same data again may be omitted.

The description has been made by consciously referring to the flowchart of FIG. 2A showing only routine repetitive processing steps. However, as long as the first sampling result standard altitude Hs$_{i=0}$ is stored in or indicated on the computation result holding section 21a in the standard altitude computation section 21, the display unit 80, and the indicated altitude holding section 52 in the altitude indication setting section 51, any exceptional processing (in a sense of initialization) may be performed instead of the flow of processing shown in the flowchart of FIG. 2A. For example, storage and indication of data Hs$_{i=0}$ may be forcibly performed by directly supplying the data to the holding sections 21a and 52 and to the display unit 80.

Further, at the next sampling time t1 after one minute for example, the pressure is measured with the pressure sensor 11 (step S1-01), digital pressure value $P_{i=1}$ is obtained by A/D conversion in the A/D conversion section 12 (step S1-02), and this value is converted into standard altitude Hs$_{i=1}$ by the reference altitude computation unit 20. Further, the immediately preceding standard altitude data (shown as "OLDALTI" in the flowchart) Hs$_{i=1-1}$=Hs$_{i=0}$ stored in the computation result holding section 21a is stored in the standard altitude value holding section 22 (step S1-04), and the latest standard altitude value (shown as "NEWALTI" in the flowchart) Hs$_{i=1}$ is stored in the computation result holding section 21a in the standard altitude computation section 21 (step S1-05). For example, if movement determination is made at 10:01, the result of determination is No (step S1-10) since the stopped state is still maintained, and the process moves to step S1-20. In step S1-20, the immediately preceding indicated data Hd$_{i=0}$ stored in the indicated altitude holding section 52 is adopted as estimated altitude Ha$_{i=1}$, i.e., Ha$_{i=1}$=Hd$_{i=0}$ by the estimated altitude computation section 70, just as it is. Unless a result indicating abnormality is obtained by abnormality determination in step S1-40, this estimated altitude Ha$_{i=1}$ is adopted as altitude Hd$_{i=1}$ to be indicated in the altitude indication setting section 51, indicated by the display unit 80 and stored as Hd$_{i=1}$ in the indicated altitude holding section 52.

In processing through these steps, Hd$_{i=1}$=Ha$_{i=1}$=Hd$_{i=0}$ and the indicated altitude Hd is maintained at a constant value of Hd$_{i=1}$=Hd$_{i=0}$=Hs$_{i=0}$. With respect to the third and other subsequence sampling times, the same processing result is obtained. Consequently, the indicated altitude Hd is constantly maintained at standard altitude Hs$_{i=0}$ set at time of entry in the stopped state (at the time of start-up in this case) as long as the stopped state is maintained. The state in which the indicated altitude Hd is constant is an acceptable result since the altitude must be constant as long as the stopped state is maintained.

In this example, however, atmospheric pressure increases monotonously from 6:00 a.m. to 10:00 a.m. at which movement is started, as shown in FIG. 3. That is, if the altimeter 1 is assumed to indicate a comparatively correct altitude value at 6:00 a.m., i.e., the altitude measurement start time, the indicated altitude Hd=Hd$_{i=0}$=Hs$_{i=0}$ deviates from the standard altitude value Hs$_{i=n}$, (Hs$_{m}$) with time after 6:00 a.m.

Typically, the result immediately before a start of movement at 10:00 a.m. is such that, if sampling is performed m times from the start time to this point in time, latest standard altitude data Hs$_{i=m}$ is stored in the computation result holding section 21a in the standard altitude computation section 21, the immediately preceding standard altitude data Hs$_{i=m-1}$ is stored in the standard altitude value holding section 22, and a constant indicated altitude value Hd=Hd$_{i=m}$=Hd$_{i=0}$=Hs$_{i=0}$ is stored in the indicated altitude value holding section 52 in the altitude indication setting section 51.

Ordinarily, the extent of variation in atmospheric pressure in one day on average is comparatively small, 5 to 6 hPa (about 40 to 50 m in terms of difference in standard altitude at points below 1000 m). Such variation is negligible in measurement over a short time period. However, if an event occurs such that the extent of variation in atmospheric pressure in such a short time period is large (typically a case where a special change in weather such as a change caused by a typhoon, different from periodic changes in atmospheric pressure in a day, is superimposed), abnormality determination processing (step S1-40) is started as an intermediate step. For example, if sampling is performed q times from the first time to this point in time, latest standard altitude data Hs$_{i=q}$ is stored in the computation result holding section 21a in the standard altitude computation unit 21 when processing in step S1-40 is started. Also, the immediately preceding standard altitude data Hs$_{i=q-1}$ is stored in the standard altitude value holding section 22, and the constant indicated altitude value Hd=Hd$_{i=q}$=Hd$_{i=0}$=Hs$_{i=0}$ is stored in the indicated altitude value holding section 52 in the altitude indication setting section 51.

Since in the assumed situation Ha$_{i=q}$=Hd$_{i=q-1}$=Hs$_{i=0}$, the abnormality determination section 60 compares Ha$_{i=q}$−Hs$_{i=q}$=|Hs$_{i=0}$−Hs$_{i=q}$| with the threshold value (shown as "ΔAL" in the flowchart) C, determines that |Hs$_{i=0}$−Hs$_{i=q}$|>C, and issues abnormality signal Ja. That is, the result of step S1-40 is Yes and processing in step S1-50 is then performed to forcibly set the altitude Hd to be indicated to the standard altitude Hs$_{i=q}$ at the corresponding point in time. This corresponds to selection of standard altitude Hs$_{i=q}$ as altitude Hd$_{i=q}$ to be indicated in the altitude indication setting section 51. As a result, the indicated altitude is newly initialized at time $t_q$, as at time $t_0$, 6:00 a.m. The state after this initialization is such that, if the altimeter 1 is assumed to operate in the same manner up to time $t_m$ immediately before the start of movement at 10:00 a.m., accumulation of the influence of variation in atmospheric pressure which proceeds after the initialization is not accumulation of the influence of the change in atmospheric pressure monotonously increasing during ($t_m$−$t_0$) as the difference between the indicated altitude Hd=Hs$_{i=0}$ and the standard altitude Hs$_{i=m}$ at the corresponding time, but accumulation of the influence of the change in atmospheric pressure monotonously increasing during a shorter time period ($t_m$−$t_q$) as the difference between the indicated altitude Hd=Hs$_{i=q}$ and the standard altitude Hs$_{i=m}$ at the corresponding time. Atmospheric pressure does not always increase or decrease monotonously but in average, the change therein increases depending monotonously on the length of time.

As an alternative to starting processing step S1-40 after processing step S1-20 to perform abnormality determination processing, processing step S1-20 shown in FIG. 2A is performed in such a manner that the indicated altitude is unconditionally maintained as indicated in parentheses, the process is immediately terminated as indicated by the imaginary line L1-20 in FIG. 2A and the next sampling processing is awaited.

It is assumed that movement has been started at 10:10 a.m. At the first sampling time $t_{m+1}$ after the start of movement, movement detection signal M1 is being issued from the movement detection unit 30. Also at time $t_{m+1}$, pressure detection with the pressure sensor 11 and conversion of the detected pressure into digital data $P_{m+1}=P_{i=m+1}$ are performed (steps S1-01 and S1-02) as in the above-described case. Detected pressure $P_{i=m+1}$ is converted into standard altitude $Hs_{i=m+1}$ (step S1-03) in the standard altitude computation section 21, the immediately preceding mth standard altitude value $Hs_{i=m}$ is saved from the computation result holding section 21a to the standard altitude value holding section 22 and stored in the same (step S1-04), and the computation result $Hs_{i=m+1}$ is stored in the computation result holding section 21a in the standard altitude computation section 21 (step S1-05).

Since in this case movement detection signal M1 is being issued and movement is being continued, the result of processing in the next movement determination step S1-10 is Yes and processing in estimated altitude computation step S1-30 is started. In this estimated altitude computation step S1-30, computation of $$Ha_{i=m+1}=Hd_{i=m}+(Hs_{i=m+1}-Hs_{i=m})$$

is performed. The former term in this equation is the immediately preceding (presently indicated) indicated altitude $Hd_{i=m}$ stored in the indicated altitude holding section 52, and the latter term is the difference between standard altitudes $Hs_i$ at sampling times $t_m$ and $t_{m+}$ which is obtained by differential altitude computation processing $Hs_{i=m+1}-Hs_{i=m}$ in the differential altitude computation section 71, and which is a value regarded as a change in altitude accompanying a move. In this step S1-30, change in altitude accompanying a move is incorporated for the first time. Time $t_m$ of the latter term is ahead of the movement start time by some length of time. Taking into consideration the fact that atmospheric pressure changes comparatively slowly in an ordinary situation, it can be said that an error due to the difference between time $t_m$ and the movement start time is ordinarily negligible if the selected sampling time interval is sufficiently shorter than the shortest time period in which a substantial change in altitude can occur accompanying a move. This error does not exist during the subsequent movement period.

After estimated altitude $Ha_{i=m+1}$ has been obtained, processing in abnormality determination processing step S1-40 is started as in the above-described case. Also in this case, a determination is made as to whether or not a difference between estimated altitude $Ha_{i=m+1}$ (incorporating a standard altitude difference as a difference in altitude accompanying a move during the movement period) and standard altitude $Hs_{i=m+1}$ exceeds the threshold value C. If the difference is not larger than the threshold value C, the result of step S1-40 is No and estimated altitude $Ha_{i=m+1}$ is selected as altitude $Hd_{i=m+1}$ to be indicated and is indicated on the display unit 80 (step S1-60).

As long as movement detection signal M1 is issued from the movement detection unit 30, and as long as no abnormal state is determined in abnormality determination processing step S1-40, the same processing is thereafter repeated.

If a comparatively accurate altitude is indicated at the movement start time $t_m$ or at time $t_{m+1}$, the amount of error in indicated altitude increases with time after 10:00 a.m. since in this example, a variation in atmospheric pressure after time $t_m$ is detected as a change in standard altitude Hs despite of movement in a horizontal region with no difference in altitude and is incorporated as a variation in altitude to obtain indicated altitude Hd. (In a case where an actual change in altitude occurs accompanying a move, a variation (decrease or increase) in atmospheric pressure accompanying the change (increase of decrease) in altitude and a variation in atmospheric pressure at one altitude point are superimposed and the former is substantially suitably incorporated as a change in standard altitude Hs, but the amount of error increases by being influenced by the latter.)

Therefore, if an abnormality is determined in abnormality determination step S1-40, the process advances from step S1-40 to reset step S1-50. In reset step S1-50, the indicated altitude $Hd=Hd_{i=v}=Hd_{i=v}$ is reset to standard altitude $Hs_{i=v}$ at the corresponding time. Thereafter, a variation in altitude is incorporated with reference to the reset value $Hs_{i=v}$.

On the other hand, ordinary variation in atmospheric pressure, typically variation having a period of one day is not determined as an abnormality in a short time period (e.g., several days). In such a situation, an error caused during the movement period from 10:00 a.m. (time $t_m$) to 4:00 p.m. (time $t_w$) remains. In the illustrated example, this error is $$Hs_{tw}-Hs_{tm}=Hs_{i=w}-Hs_{i=m}$$

(While the error is equal to $P_L-P_M$ and has a maximum absolute value in this example, the amount of error may be only a portion of it.)

If a move is made in a pattern or way with a regularity during the time period from 10:00 a.m. to 4:00 p.m., this error is accumulated day by day unless determined as an abnormality by abnormality determination processing S1-40. That is, if no move is made during the time period from 4:00 p.m. to 10:00 a.m. in the next day, indicated altitude $Hd_{i=w}$ at 4:00 p.m. when the movement is stopped is maintained. Then, at time $t_{m+1}$ immediately after a start of movement at $t_m$, 10:00 a.m. in the next day, because of periodicity, an altitude to be indicated is $Hd_{i=m+1}$, data held in the computation result holding section 21a in the standard altitude computation section 21 is $Hs_{i=m+1}$, data held in the standard altitude holding section 21 is $Hs_{i=m}$, and data held in the indicated altitude holding section is $Hd_{i=m}=Hd_{i=w}$. An altitude estimated therefrom by the estimated altitude computation section 50 is $Ha_{i=m+1}=Hd_{i=w}+(Hs_{i=m+1}-Hs_{i=m})$, and the difference obtained as the object of determination processing in the abnormality determination section 60 is $Ha_{i=m+1}-Hs_{i=m+1}=Hd_{i=w}-Hs_{i=m}$. Thus, during the stoppage period, there is, of course, no accumulation of errors. On the other hand, the error between the indicated altitude and the standard altitude is also accumulated during the movement period from 10:00 a.m. to 4:00 p.m. in the next day, as in the above-described case. The accumulation of error is thereby increased by $(P_L-P_M)$. If this accumulation is repeated, the accumulated amount is increased in proportion to the number of days and the resulting amount is considerably large.

While processing in the case where no abnormality determination is made has been described, processing in this altimeter 1 includes abnormality determination processing step S1-40 and relating processing step S1-50 in the abnormality determination section 60, whereby, when the accumulation of error is about to exceed the acceptable level set as threshold value C, it is forcibly reset to standard altitude Hs with no accumulation of errors. Thus, while movement determination is made to minimize the influence of variation in atmospheric pressure during a stoppage period on the altitude indication given by the altimeter 1, an accumulation or error which may be newly caused when movement determination processing is performed can be reliably limited to the acceptable level.

An example of processing relating to movement in a horizontal region has been described for ease of explanation. However, it is apparent that the explanation of above-described accumulation of error and avoidance of excessive error accumulation by abnormality determination processing steps S1-40 to S1-60 in the abnormality determination section 60 applies directly to a case of moving in a region where there are differences in altitude and where the altimeter 1 can be used essentially conveniently, since only a change in atmospheric pressure accompanying a change in altitude is superimposed during moving in such a region as described above.

An example of setting of standard altitude Hs as an altitude initial value at a start of measurement with the altimeter 1 has been described. In ordinary cases, however, atmospheric pressure has different values generally ranging from 990 hPa to 1030 hPa at arbitrary points in time even at a height of 0 m above the sea level for example. Therefore, in a case where the standard altitude Hs is used with the assumption that a place of a 1013 hPa atmospheric pressure is at a height of 0 m above the sea level, a certain error in altitude exists initially (this deviation, about 20 hPa, corresponds to a deviation of about 250 m in terms of the standard altitude). On the other hand, users who will use the altimeter 1 are considered to know peculiar atmospheric pressure characteristics of particular regions on the earth with respect to seasons, etc., (atmospheric pressure tends to become higher or lower than a standard atmospheric pressure) or to be able to ascertain with substantially high accuracy the atmospheric pressure of known places at particular points in time from weather information, etc. The altimeter may be designed so that such users can set an initial value. In this manner, it is possible to improve the accuracy of altitude indication with the altimeter under certain restricted conditions by considering variation in atmospheric pressure.

Figure 4A:
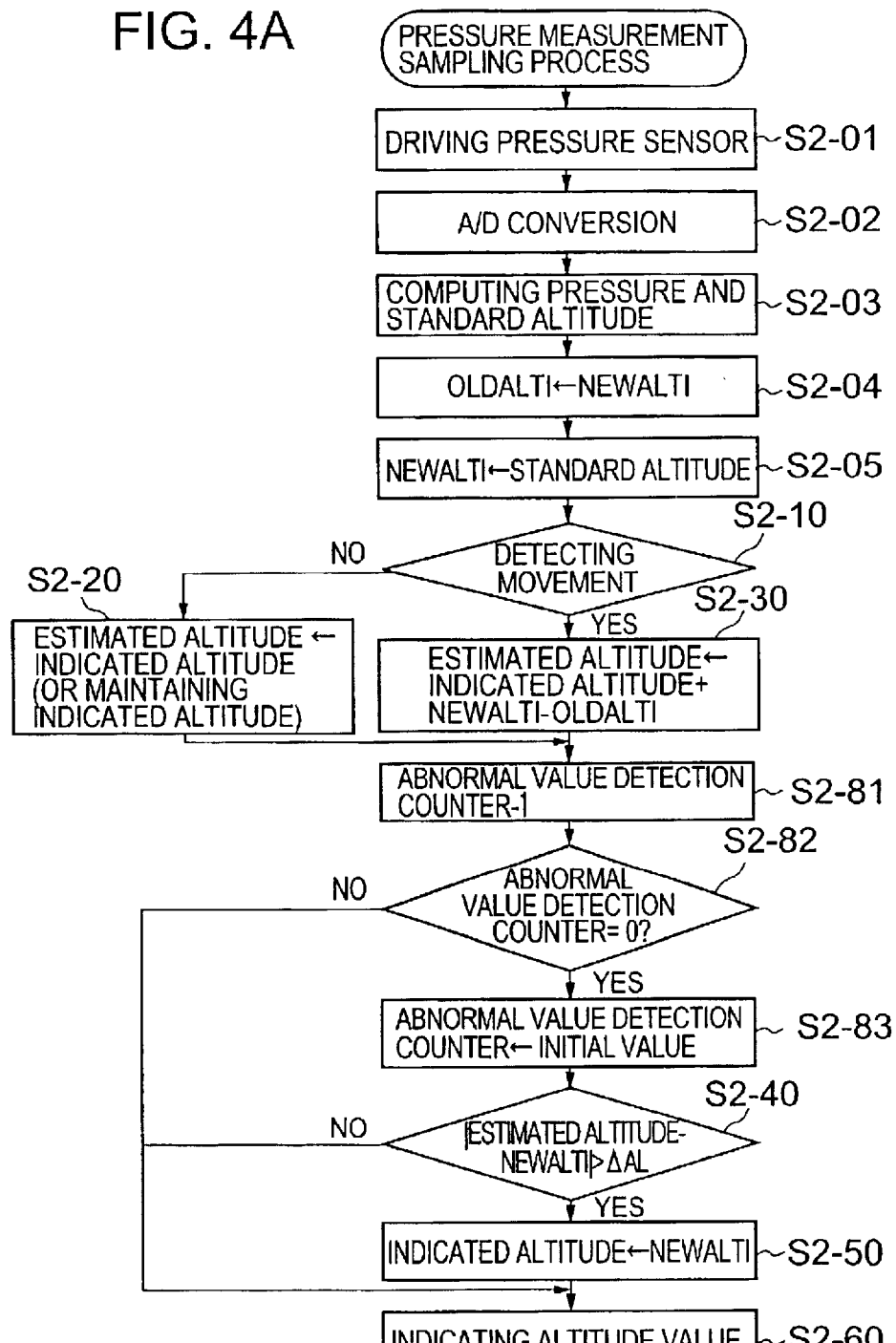
FIG. 4A is a flowchart of the operation.
Figure 4B:
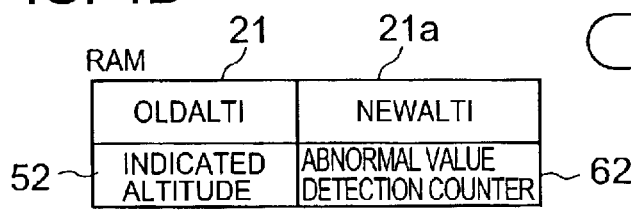
FIG. 4B is a diagram schematically showing relating main work areas.

FIGS. 4A and 5A show flowcharts in accordance a second embodiment, which are obtained from the flowchart of FIG. 2A in such manner that programmed control (processing) shown in the flowchart of FIG. 2A is partially changed to enable a user to set an initial value. FIGS. 4B and 5B show main work areas respectively related to these flowcharts. In the flowchart of FIG. 4A for the second embodiment, the same processings as those in the flowchart of FIG. 2A are indicated by similar reference symbols (the portions of the symbols after "-" are the same, while "S2-" is used instead of "S1-").

An altimeter 1a (FIG. 1) of the second embodiment will be described with respect to altitude initialization by a user with reference to FIGS. 5 and 1. The altimeter 1a is configured generally in the same manner as the altimeter 1 except for an abnormality determination control section 61 which is added as indicated by the imaginary line, and which will be described below in detail. In this embodiment, a user gives an instruction for initialization, for example, by pressing to a pushbutton switch (not shown). By this initialization instruction, processing for initialization of the altimeter 1a is performed, as in the above-described case. For example, the computation result holding section 21a in the standard altitude computation section 20 of the reference altitude computation unit 20 is reset to 0.

The user then inputs an altitude value $H_0$ through input means (not shown) (step S2-70). The input means may be formed in a portion of the case of the altimeter 1a or the altimeter 1a may be capable of receiving a signal in wireless or optical form from another input means. The altitude initial value $H_0$ set by the user is indicated on the display unit 80 through the altitude indication setting section 51 in the altimeter 1a shown in FIG. 1 (step S2-72) and is forcibly written to the indicated altitude holding section 52 operable in association with the altitude indication setting section 51 (step S2-71). Also, the arrangement may be such that indicated altitude Hd is forcibly written to the indicated data storage area of the altitude indication setting section 51 (step S2-71), forcibly indicated on the display unit 80 (step S2-72), and stored in the indicated altitude holding section 52 to be used as the currently-indicated altitude for the next altitude estimation.

After the completion of indication processing, the standard altitude at the time and place at which the altitude setting has been performed by the user is obtained and pressure measurement is performed to determine the difference between the standard altitude and the altitude set by the user (initial indicated altitude) (steps S2-73 to S2-76).

Pressure detection with the pressure sensor 11 is performed by following a sampling instruction according to a standard pressure initialization instruction to obtain a detected pressure value (step S2-73), as in the above-described steps S1-01 to S1-03 and S1-05, and the detected pressure value is A/D converted into digital data $P_{i=0}$ by the A/D conversion section 12 (step S2-74). Further, this data is converted into the corresponding standard altitude $Hs_{i=0}$ by the standard altitude computation section 21 of the reference altitude computation unit 20 (step S2-75) and the standard altitude is stored in the computation result holding section 21a of the standard altitude computation section 21. Processing for relating the altitude $Hd_{i=0}=H_0$ set by the user to be indicated and the standard altitude $Hs_{i=0}$ in the altimeter 1a is thereby completed.

If the user further makes an altitude setting, the above-described abnormality determination processing is inhibited during a predetermined time period after the altitude setting processing by the user, because it is considered that the reliability of indicated altitude $Hd=H_0$ set at the corresponding time and place is ordinarily high. In the second embodiment, therefore, a processing step S2-80 shown in FIG. 5A and processing steps S2-81 and S2-82 shown in FIG. 4A are added and a step S2-83 performed in association with steps S2-81 and S2-82 to designate intervals at which abnormality determination processing is thereafter performed is also provided. However, the arrangement may be such that methods (modes) of processing are set selectable to enable, if necessary, abnormality determination processing to be performed regardless of the existence/nonexistence of a user's setting. In such a case, each of steps S2-80, S2-81, S2-82, and S2-83 may be avoided (bypassed) according to a mode selected by the user.

In step S2-80 shown in FIG. 4A in abnormality determination inhibition period control processing, a time period during which abnormality determination by the abnormality determination processing section 60 is inhibited is set after the completion of processing in step S2-76. For example, for this setting, the abnormality determination control section 61 related to the abnormality determination processing section 60 is provided and an abnormality value detection counter 62 (see FIG. 1 and FIG. 5B) is provided in the abnormality determination control section 61, as indicated by the imaginary line in FIG. 1. An abnormality determination inhibition period Tn is set in the counter 62. For example, this abnormality determination inhibition period Tn is designated with reference to sample periods as units to avoid abnormality determination during the time period in which sampling is performed Tn times. A value is generated in the abnormality determination section 61 such that this abnormality determination inhibition period is, for example, about one month, and is written to the counter 62. Needless to say, the arrangement may be such that the user can designate the period Tn. On the other hand, in steps S2-81 and S2-83 shown in FIG. 4A, the number of times sampling is performed is counted (step S2-81) and abnormality determination relating to altitude indication is avoided until the number of times sampling is performed becomes equal to Tn sampling times corresponding to the abnormality determination inhibition period. In step S2-83, after a lapse of the abnormality determination inhibition period Tn after user's setting, abnormality determination processing is temporarily performed and timing for abnormality determination which will be regularly performed is designated. That is, if the number of times sampling is performed corresponding to one week for example is designated in step S2-83, this step enables bypassing of abnormality determination for one week in association with steps S2-81 and S2-82. In other words, the value designated in step S2-83 designates the intervals at which abnormality determination is performed after the lapse of the initial period. For example, abnormality determination is performed one time in every week. For example, the value in the step S2-83 (the intervals at which abnormality determination processing is regularly performed) may also be generated automatically in the abnormality determination control section 61 and set in the counter in step S2-83, or the arrangement may be such that the value itself (not the number of times sampling is performed but a value designating a period) can be designated by the user.

The altitude measuring operation of the altimeter 1a will next be described with reference mainly to FIG. 4. It is assumed here that the same atmospheric pressure pattern and movement timing as those in the embodiment described above with reference to FIG. 3 are set.

After the completion of initialization processing by the user in abnormality detection inhibition period setting step S2-80 shown in FIG. 5A, sampling processing shown in FIG. 4A is, typically, immediately performed and pressure detection with the pressure sensor 11 (step S2-01) and A/D conversion by the A/D conversion section 12 (step S2-02) are performed. Further, conversion into standard altitude $Hs=Hs_{i=1}$ by the standard altitude computation section 21 of the reference altitude computation unit 20 (step S2-03) is performed. These steps are the same as processings S1-01 to S1-03 after initialization in the flowchart of FIG. 2A.

For example, if the stopped state is maintained after user's setting at 6:00 a.m. until 10:00 a.m. as described above with reference to FIG. 3, estimated indicated altitude Ha is maintained at a constant value $Ha_i=Hd_{i=0}=H_0$ corresponding to the initial indicated altitude $H_0$ from 6:00 a.m. to 10:00 a.m. (step S2-20). On the other hand, since abnormality determination is not performed in a period shorter than the set period equal to one month (the result of step S2-82 is No), the constant value $H_0$ is indicated as indicated altitude Hd from 6:00 a.m. to 10:00 a.m. Accordingly, at time $t_{m+1}$ when movement is started, altitude $Hd_{i=m}$ indicated on the display unit 80, i.e., the indicated altitude $Hd_{i=m}$ stored in the indicated altitude holding section 52 related to the altitude indication setting section 51 (set in the immediately preceding time i=m and in the state of being indicated from that time) is the same as the constant value $H_0$. On the other hand, the computation result holding section in the standard altitude computation section 21 holds the latest standard altitude $Hs_{i=m+1}$ accompanying a change in atmospheric pressure, and the standard altitude holding section 22 holds the standard altitude $Hs_{i=m}$ obtained at the immediately preceding sampling time.

Therefore, when the movement detection unit 30 confirms that movement has been started at time $t_{m+1}$, processing in step S2-30 is started and estimated altitude $Ha=Ha_{i=m+1}$ is obtained from $$Ha=Ha_{i=m+1}=Hd_{i=m}+(Hs_{i=m+1}-Hs_{i=m}) \qquad \text{(step S2-30)}$$

Abnormality determination processing (S2-82 to S2-50) is avoided. Thereafter, estimated altitude $Ha=Ha_{i=m+1}$ is selected as indicated altitude $Hd=Hd_{i=m+1}$ and is indicated under the control of the indication setting section 51. Accordingly, the altitude $Hd=Hd_{i=x}$ indicated at time $t_x$ during the movement period is basically $$Hd = Hd_{i=x} = Hd_{i=x-1} + (Hs_{i=x} - Hs_{i=x-1})$$
$$= H_0 + (Hs_{i=x} - Hs_{i=x-1})$$

Since no abnormality determination is made during one month, the altitude $Hd=Hd_{i=v}$ indicated at time $t_v$, 4:00 p.m. is basically $$Hd = Hd_{i=v} = Hd_{i=v-1} + (Hs_{i=v} - Hs_{i=v-1})$$
$$= H_0 + (Hs_{i=v} - Hs_{i=m})$$

If no move is made until time $t_m$, 10:00 a.m. in the next day, the indicated altitude $Hd=Hd^{(2)}_{i=m}$ is constantly maintained and $$Hd=Hd^{(2)}_{i=m}=Hd_{i=v}=H_0+(Hs_{i=v}-Hs_{i=m})$$

At time $t_v$, 4:00 p.m. in the next day (second day), $$Hd = Hd^{(2)}_{i=v} = Hd^{(2)}_{i=v-1} + (Hs_{i=v} - Hs_{i=v-1})$$
$$= Hd^{(2)}_{i=m} + (Hs_{i=v} - Hs_{i=m})$$
$$= H_0 + 2(Hs_{i=v} - Hs_{i=m})$$

Thus, the influence of variation in atmospheric pressure during the moves in the two days remains.

The resulting indicated altitude after about one month is $$Hd=H_0+30(Hs_{i=v}-Hs_{i=m})$$

After a lapse of one month, the content of the abnormality value detection counter 62 becomes zero, the result of step S2-82 is Yes, and processing in step S2-83 is started. For example in this step, an initial value is set such that abnormality determination is made after a week (abnormality determination is performed every week if the same initial value is set again every week). Needless to say, the initial value may be changed according to other factors.

In any case, a timing for abnormality determination processing performed afterwards is set in step S1-83 and the same abnormality determination processing 1-40 as that described above is performed. Other details are the same as those described above except that abnormality determination processing is thereafter performed every week (at intervals designated in step S2-83). If the estimated altitude Ha to be newly indicated differs from the standard altitude Hs by an amount larger than the threshold value C at the time of indication, the standard altitude Hs at the corresponding time is adopted as indicated altitude Hd and the indicated altitude is reset to this value, thus avoiding excessive accumulation of errors in indicated altitude Hd.

A movement-detecting altimeter according to a third embodiment of the present invention will next be described with reference to the flowcharts of FIG. 6A and FIG. 7A and the block diagram of FIG. 1. FIGS. 6B and 7B show main work areas respectively related to these flowcharts. In the flowcharts of FIGS. 6A and 7B, the same processings as those in the flowcharts of FIG. 2A and FIG. 5B are indicated by similar reference symbols (the portions of the symbols after "-" are the same) while "S3-" or "L3-" is used instead of "S1-", "S2-", or "L1-".

In the movement-detecting altimeter 1b according to the third embodiment differs from those in the other embodiments in that altitude $H_0$ is initialized by a user, the difference between the initialized altitude Ho and the standard altitude $Hs_{i=0}$ at the corresponding time and place is saved as an offset value $\Delta Hu$, determination is made as to abnormality of altitude $Ha_i$ thereafter estimated by comparing the estimated altitude $Ha_i$ with an effective standard altitude $He_i$ obtained by adding offset value $\Delta Hu$ to standard altitude $Hs_i$, and offset value $\Delta Hu$ is also added to indicated altitude $Hd_i$ to be reset if an abnormality is determined.

More specifically, in the altimeter 1b, the reference altitude computation unit 20 has an offset value computing and holding section 24, as indicated by the imaginary line in FIG. 1, and reference altitude Hk is treated as effective standard altitude He obtained by adding offset value $\Delta Hu$ to standard altitude Hs, i.e., $Hk=He=Hs+\Delta Hu$.

Figure 7A:
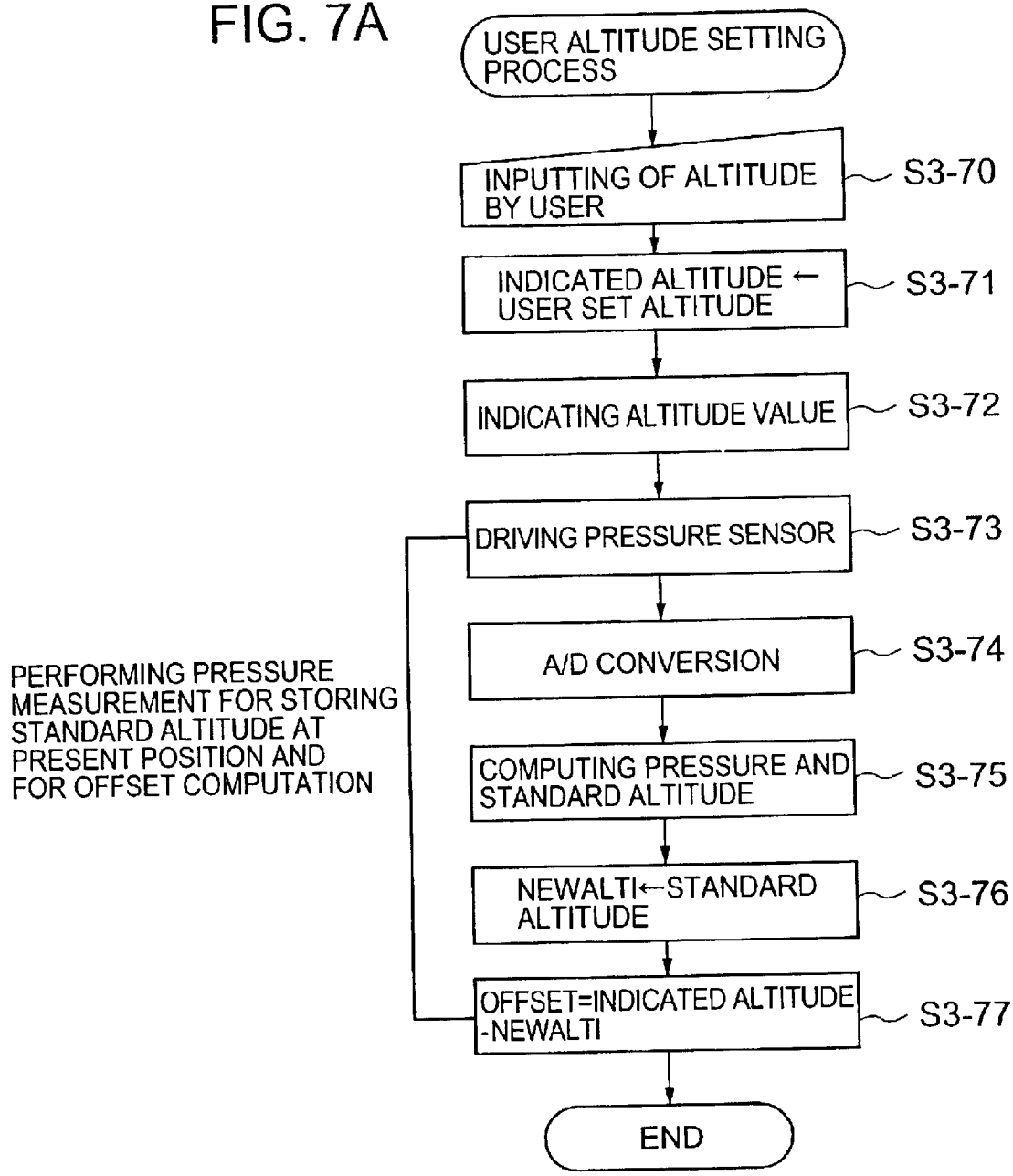
FIG. 7A is a flowchart of relating processing steps.
Figure 7B:
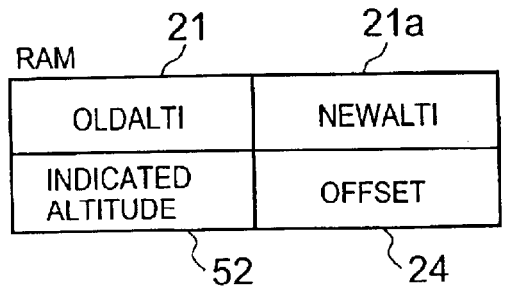
FIG. 7B is a diagram schematically showing relating main work areas.

That is, as shown in FIG. 7A, altitude $H_0$ is first set by a user when predetermined initialization processing is performed or after this processing (step S3-70), and altitude $H_0$ set by the user is stored in the indicated altitude holding section 52 related to the altitude indication setting section 51 (S3-71), as in the above-described steps S2-71 and S2-72. Altitude $H_0$ is also indicated on the display unit 80 (S3-72). In this embodiment, however, altitude $H_0$ set by the user is also supplied to the offset value computing and holding section 24. Sampling is started and pressure-detection with the pressure sensor 11 is performed (step S3-73), a detected output value is converted into digital data $P_{i=0}$ (step S3-74), and this data is further converted into standard altitude $Hs_{i=0}$ by the standard altitude computation section 21 of the reference altitude computation unit 20 (step S3-75). This standard altitude $Hs_{i=0}$ is also stored in the computation result storage section 21a in the standard altitude computation section 21 (step S3-76). These steps S3-73 to S3-76 are substantially the same as steps S2-73 to S2-76 shown in FIG. 5 A.

In this altimeter 1b, the difference $\Delta Hu=Hd-Hs_{i=0}=H_0-Hs_{i=0}$ between the altitude $Hd=H_0$ set by the user to be indicated and standard altitude $Hs_{i=0}$ at the corresponding time $t_0=t_{i=0}$ stored in the computation result storage section 21a in the standard altitude computation section 21 is obtained as off set value (indicated as "OFFSET" in the flowchart) $\Delta Hu$ in the offset value computing and holding section 24 and is stored in the offset value holding section in the offset value computing and holding section 24 (S3-77). That is, steps S3-70 to S3-76 in the flowchart shown in FIG. 7A are the same as steps S2-70 to S2-76 in the flowchart shown in FIG. 5A with respect to use of a pressure value set by the user. However, subsequent step S2-80 and step S2-77 are utterly different processings respectively using set values largely different from each other in use and in way of use.

The altitude measuring operation of the altimeter 1b will next be described with reference mainly to FIG. 6A. It is assumed here that the same atmospheric pressure pattern and movement timing as those in the embodiment described above with reference to FIG. 3 are set.

After the completion of initialization processing by the user in step S3-77 shown in FIG. 7A, sampling processing shown in FIG. 6A is, typically, immediately performed and pressure detection with the pressure sensor 11 (step S3-01) and A/D conversion by the A/D conversion section 12 (step S3-02) are performed. Further, conversion into standard altitude $H_s=H_{si=1}$ by the standard altitude computation section 21 of the reference altitude computation unit 20 (step S3-03) is performed. These steps are the same as processings S1-01 to S1-03 or S2-01 to S2-03 after initialization in the flowchart of FIG. 2A or FIG. 4B.

For example, if the stopped state is maintained after user's setting at 6:00 a.m. until 10:00 a.m. as described above with reference to FIG. 3, indicated altitude Hd is maintained at a constant value $Hd_i=Hd_{i=0}=H_0$ corresponding to the initial indicated altitude $H_0$ (step S3-20) unless determined as an abnormality by abnormality determination (steps S3-41 and S3-42). In the case of the third embodiment shown in FIG. 6A, however, the reference value to be compared with initialized indicated altitude $H_0$ in abnormality determination is not standard altitude $Hs_i$ but effective standard altitude $Hk_i=He_i=Hs_i+\Delta Hu$ set as a reference altitude (step S3-41). Ordinarily, therefore, there is, initially, substantially no possibility of indicated altitude $H_0$ being determined as an abnormality by abnormality determination, the result of abnormality determination step S3-41 is No, and the initial set value $H_0$ is indicated as indicated altitude $Hd_i$. When an abnormality is determined, the same processing S3-51 as that in step S2-51 shown in FIG. 2A and described above is performed. In this case, it is assumed that no abnormality is determined before 10:00 a.m.

At time $t_{m+1}$ when movement is started, the altitude $Hd_{i=m}$ indicated on the display unit 80, i.e., indicated altitude $Hd_{i=m}$ stored in the indicated altitude holding section 52 related to the altitude indication setting section 51, is the same as the initial set value $H_0$. On the other hand, the computation result holding section 21a in the standard altitude computation section 21 holds the latest standard altitude $Hs_{i=m+1}$ accompanying a change in atmospheric pressure, and the standard altitude holding section 22 holds $Hs_{i=m}$ obtained at the immediately preceding sampling time. Also, the offset is $\Delta Hu$.

When the movement detection unit 30 confirms that movement has been started at time $t_{m+1}$, estimated altitude Ha is obtained as $Ha_{i=m+1}=Hd_{i=m}+(Hs_{i=m+1}-Hs_{i=m})=H_0+(Hs_{i=m+1}-Hs_{i=m})$ (step S3-31) and is compared with effective standard altitude $He_{i=m+1}=Hs_{i=m+1}+\Delta Hu$ in abnormality determination step S3-41. A determination is thereby made as to whether there is a difference exceeding the threshold value C. If it is determined that there is no abnormality, estimated altitude $Ha=Ha_{i=m+1}$ is adopted as a new altitude $Hd=Hd_{i=m+1=Hai=m+1}$ to be indicated, and is indicated (step S3-60).

Then, $Ha_{i=m+1}-He_{i=m+1}=(H_0-Hs_{i=m})-(H_0-Hs_{i=0})=Hs_{i=0}-Hs_{i=m}$. As the movement is continued, the influence of variation in atmospheric pressure is accumulated, as is that described above with reference to the flowchart of FIG. (2).

That is, as long as no abnormality is determined, the same processing is repeated and indicated altitude Hd becomes $Hd=Hd_{i=w}=Ha_{i=w}$ at time $t_w$ at which the movement is stopped. Since $Ha_{i=w}=Hd_{i=w-1}+(Hs_{i=w}-Hs_{i=w-1})=Ha_{i=w-1}+(Hs_{i=w}-Hs_{i=w-1})=\ldots=Ha_{i=m}+(Hs_{i=w}-Hs_{i=m})$, there is also a possibility that variation in standard altitude $(Hs_{i=w}-Hs_{i=m})$ accompanying a change in variation in atmospheric pressure during movement may cause variation in indicated altitude Hd to increase the accumulation or error, as in the case shown in FIG. 2A. In principle, the effect of avoiding excessive accumulation of errors by performing abnormality determination processing is the same as that described above.

In abnormality determination processing in this third embodiment, the estimated altitude Ha is compared not with the standard altitude Hs but with the effective standard altitude He including offset value ΔHu accompanying a user's setting, thereby improving the accuracy of abnormality determination processing under ordinary conditions.

In any case, there is a possibility that errors accompanying variation in atmospheric pressure may accumulate depending on the way in which a move is made, as described above with respect to the first and second embodiments. In such a case, an abnormality is determined in abnormality determination step S3-41 and the result of step S3-41 is Yes. Processing in step S3-51 is then performed to forcibly set the indicated altitude Hd in correspondence with the effective standard altitude He=Ha+ΔHu, which is the reference altitude at the corresponding time and place. The reason for forcibly setting the indicated altitude Hd in correspondence with the effective standard altitude He which is the reference altitude Hk is that the estimated altitude is compared with the reference altitude in abnormality determination processing while maintaining the incorporation of the offset ΔHu. However, the arrangement may alternatively be such that once abnormality processing is performed, the offset is cleared, the indicated altitude Hd is set in correspondence with the standard altitude, and the standard altitude is used as a comparison reference value in abnormality determination processing thereafter performed.

If it is thought that in the movement-detecting altimeter it is difficult to completely avoid accumulation of error in the indicated altitude under the influence of variation in atmospheric pressure during movement in particular, an alarm indicating that the indicated altitude is higher may be issued when an abnormality is determined by abnormality determination processing. In such a case, an alarm unit 65 may be provided, as indicated by the imaginary line in FIG. 1, to notify an abnormality when abnormality signal Jn is output from the abnormality determination section 60. A notice indicating an abnormality may be provided as an indication of the abnormality, an alarm based on an acoustic signal or a combination of these two means.

In an altimeter 1b, of a fourth embodiment having such an abnormality notifying function, operations or processing such as shown in the flowchart of FIG. 8A are performed. FIG. 8B shows relating main work areas. In FIG. 8A, processing steps similar to those in FIG. 2A are indicated by using "S4-" instead of "S1-". The flowchart shown in FIG. 8A differs from the flowchart shown in FIG. 2A in that an abnormality notifying step S4-51 is provided in place of the indication reset step S1-50. Therefore detection of an abnormality or abnormality determination and preceding steps are performed in the same manner as that in the altimeter 1 shown in the flowchart of FIG. 2A. While notifying of an abnormality is performed for providing information that an abnormal value is indicated, the altitude indication itself may be continued by being reset as in step S1-50 shown in FIG. 2A.

What is claimed is:

1. A movement-detecting altimeter comprising:
   pressure detection means for detecting pressure of atmospheric air;
   reference altitude computation means for computing a reference altitude from a pressure detected by the pressure detection means;
   movement detection means for detecting whether or not a moving condition is maintained;
   movement dependent altitude updating means for updating an indicated altitude when the moving condition is maintained, the movement dependent altitude updating means ordinarily avoiding updating of the indicated altitude when the moving condition is not maintained,
   estimated altitude computation means for obtaining an estimated altitude by regarding as a change in altitude a variation in reference altitude obtained by reference altitude computation means from the latest detected pressure value and the preceding detected pressure value obtained by the pressure detection means when the moving condition is maintained;
   abnormality determination means for making a determination as to whether or not the estimated altitude is an abnormal value; and
   altitude indication setting means for setting, as an altitude to be indicated, a designated altitude based on the reference altitude when the abnormality determination means determines that the estimated altitude is an abnormal value, and for setting the estimated altitude as an altitude to be indicated when the abnormality determination means determines that the estimated altitude is not an abnormal value.

2. A movement-detecting altimeter according to claim 1, wherein the estimated altitude computation means is arranged to obtain an estimated altitude by regarding as a change in altitude a variation in reference altitude obtained by reference altitude computation means from the latest detected pressure value and the immediately preceding detected pressure value obtained by the pressure detection means when the moving condition is maintained, and the abnormality determination means is arranged to make a determination as to whether or not the estimated altitude is an abnormal value by determining whether or not the difference between the estimated altitude and the reference altitude is within a predetermined range.

3. A movement-detecting altimeter according to claim 2, wherein the reference altitude computation means is arranged to compute the reference altitude on the basis of an atmosphere-altitude conversion equation according to ordinary characteristics of atmospheric air.

4. A movement-detecting altimeter according to claim 2, wherein the reference altitude computation means is arranged to compute as the reference altitude an altitude value which is the sum of a standard altitude obtained on the basis of an atmosphere-altitude conversion equation according to ordinary characteristics of atmospheric air from an atmospheric pressure when an altitude is set by a user, and the difference between the standard altitude and the altitude set by the user.

5. A movement-detecting altimeter according claim 1, further comprising abnormality determination control means for controlling timing of abnormality determination processing performed by the abnormality determination means.

6. A movement-detecting altimeter according to claim 5, wherein the abnormality determination control means is arranged to make the abnormality determination means perform abnormality determination processing with a predetermined sampling interval.

7. A movement-detecting altimeter according to claim 5, wherein the abnormality determination control means is arranged to suspend abnormality determination processing performed by the above-described determination means during a predetermined time period after a time when the user sets an altitude value.

8. A movement-detecting altimeter comprising:
   pressure detection means for detecting pressure of atmospheric air;
   reference altitude computation means for computing a reference altitude from a pressure detected by the pressure detection means;
   movement detection means for detecting whether or not a moving condition is maintained;

movement dependent altitude updating means for updating an indicated altitude when the moving condition is maintained, the movement dependent altitude updating means ordinarily avoiding updating of the indicated altitude when the moving condition is not maintained;

estimated altitude computation means for obtaining an estimated altitude by regarding as a change in altitude a variation in reference altitude obtained by reference altitude computation means from the latest detected pressure value and the preceding detected pressure value obtained by the pressure detection means when the moving condition is maintained;

abnormality determination means for making a determination as to whether or not the estimated altitude is an abnormal value; and abnormality notifying means for notifying the determination of abnormality when the abnormality determination means determines that the estimated altitude is an abnormal value.

* * * * *